(12) United States Patent
Yamazaki

(10) Patent No.: US 11,762,236 B2
(45) Date of Patent: Sep. 19, 2023

(54) LIGHT SOURCE UNIT, DISPLAY DEVICE, AND LIGHT SOURCE UNIT MANUFACTURING APPARATUS

(71) Applicant: FUJIFILM Corporation, Tokyo (JP)

(72) Inventor: Yoshiro Yamazaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/818,906

(22) Filed: Aug. 10, 2022

(65) Prior Publication Data

US 2022/0390797 A1 Dec. 8, 2022

Related U.S. Application Data

(63) Continuation of application No. PCT/JP2020/048120, filed on Dec. 23, 2020.

(30) Foreign Application Priority Data

Feb. 18, 2020 (JP) .................................. 2020-025054

(51) Int. Cl.
*G02F 1/13357* (2006.01)

(52) U.S. Cl.
CPC .. *G02F 1/133605* (2013.01); *G02F 1/133603* (2013.01); *G02F 1/133608* (2013.01)

(58) Field of Classification Search
CPC ......... G02F 1/133605; G02F 1/133608; F21Y 2103/10
See application file for complete search history.

(56) References Cited

U.S. PATENT DOCUMENTS

2009/0003002 A1 1/2009 Sato
2012/0013811 A1 1/2012 Shimizu
(Continued)

FOREIGN PATENT DOCUMENTS

JP 2008-027886 A 2/2008
JP 2013-012417 A 1/2013
(Continued)

OTHER PUBLICATIONS

International Search Report issued in PCT/JP2020/048120; dated Mar. 2, 2021.
(Continued)

*Primary Examiner* — Karabi Guharay
(74) *Attorney, Agent, or Firm* — Studebaker & Brackett PC

(57) ABSTRACT

A light source unit and a display device that are further thinned while evenness in brightness on an emission surface is secured are provided.
A light source unit and a display device of the present invention include a light source installation surface on which at least one micro light source is installed, a base that is arranged with the light source installation surface and has a light-transmitting property, a reflection pattern that is formed on a first surface of the base positioned on a light source installation surface side based on light distribution characteristics of the at least one micro light source, and a low reflection pattern that is formed in a region of the light source installation surface positioned around the at least one micro light source based on the light distribution characteristics. A reflectivity in the region of the light source installation surface in which the low reflection pattern is formed is less than a reflectivity in a region other than the region in which the low reflection pattern is formed.

20 Claims, 23 Drawing Sheets

(56) References Cited

U.S. PATENT DOCUMENTS

| | | | |
|---|---|---|---|
| 2013/0011617 A1 | 1/2013 | Tasaki et al. | |
| 2013/0070170 A1 | 3/2013 | Namekata | |
| 2014/0104816 A1 | 4/2014 | Takasi et al. | |
| 2020/0105966 A1* | 4/2020 | Sasaoka | H01L 33/502 |

FOREIGN PATENT DOCUMENTS

| | | |
|---|---|---|
| JP | 2014-129549 A | 7/2014 |
| JP | 2018-037316 A | 3/2018 |
| WO | 2010/113361 A1 | 10/2010 |
| WO | 2011/142170 A1 | 11/2011 |

OTHER PUBLICATIONS

International Preliminary Report on Patentability and Written Opinion issued in PCT/JP2020/048120; dated Aug. 23, 2022.
An Office Action; "Notice of Reasons for Refusal," mailed by the Japanese Patent Office dated May 9, 2023, which corresponds to Japanese Patent Application No. 2022-501660 and is related to U.S. Appl. No. 17/818,906; with English language translation.

* cited by examiner

FIG. 8 BRIGHTNESS/RADIATION BRIGHTNESS W/sr mm²

FIG. 25
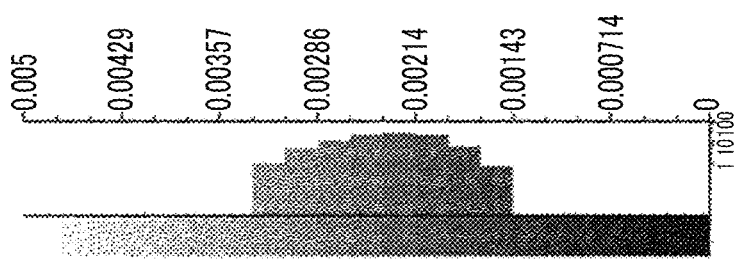
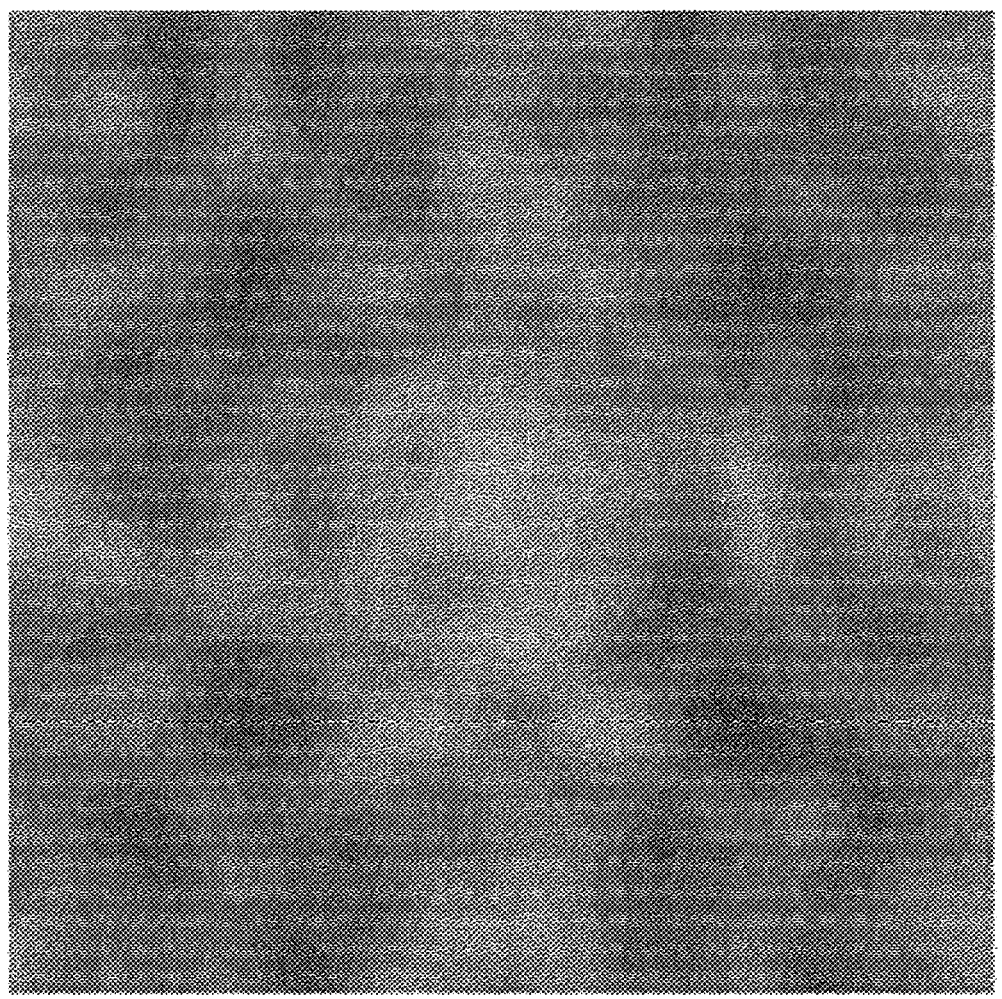

FIG. 26
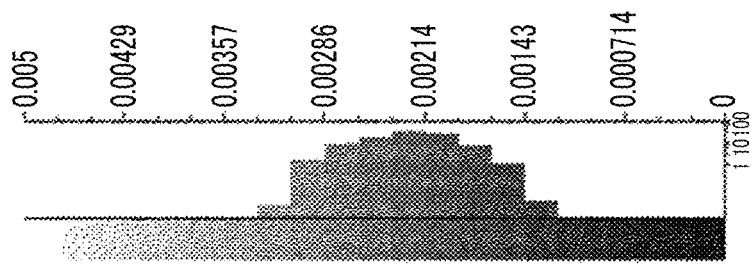
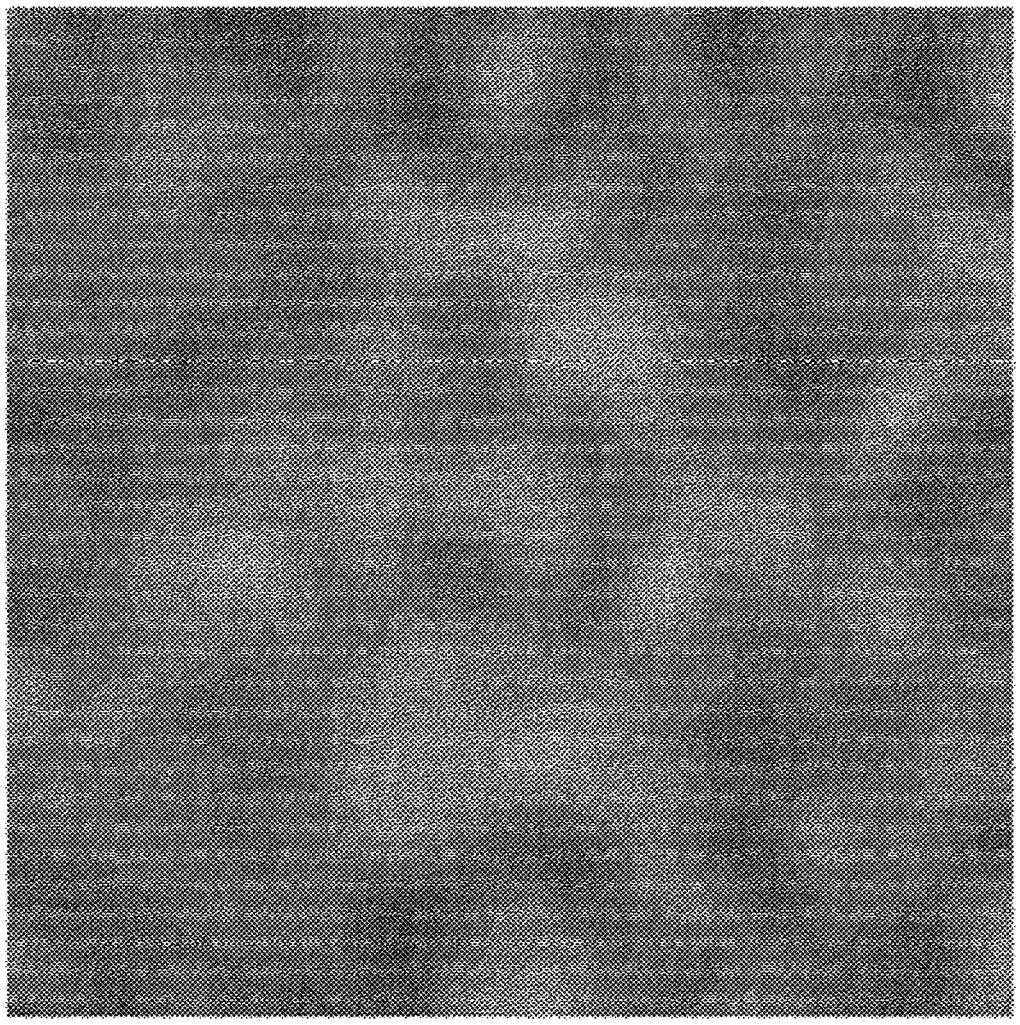
BRIGHTNESS/RADIATION BRIGHTNESS W/sr mm²

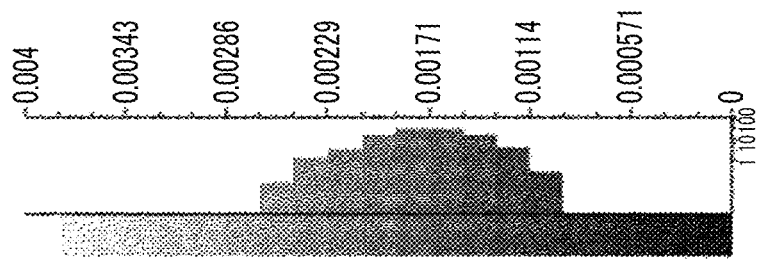
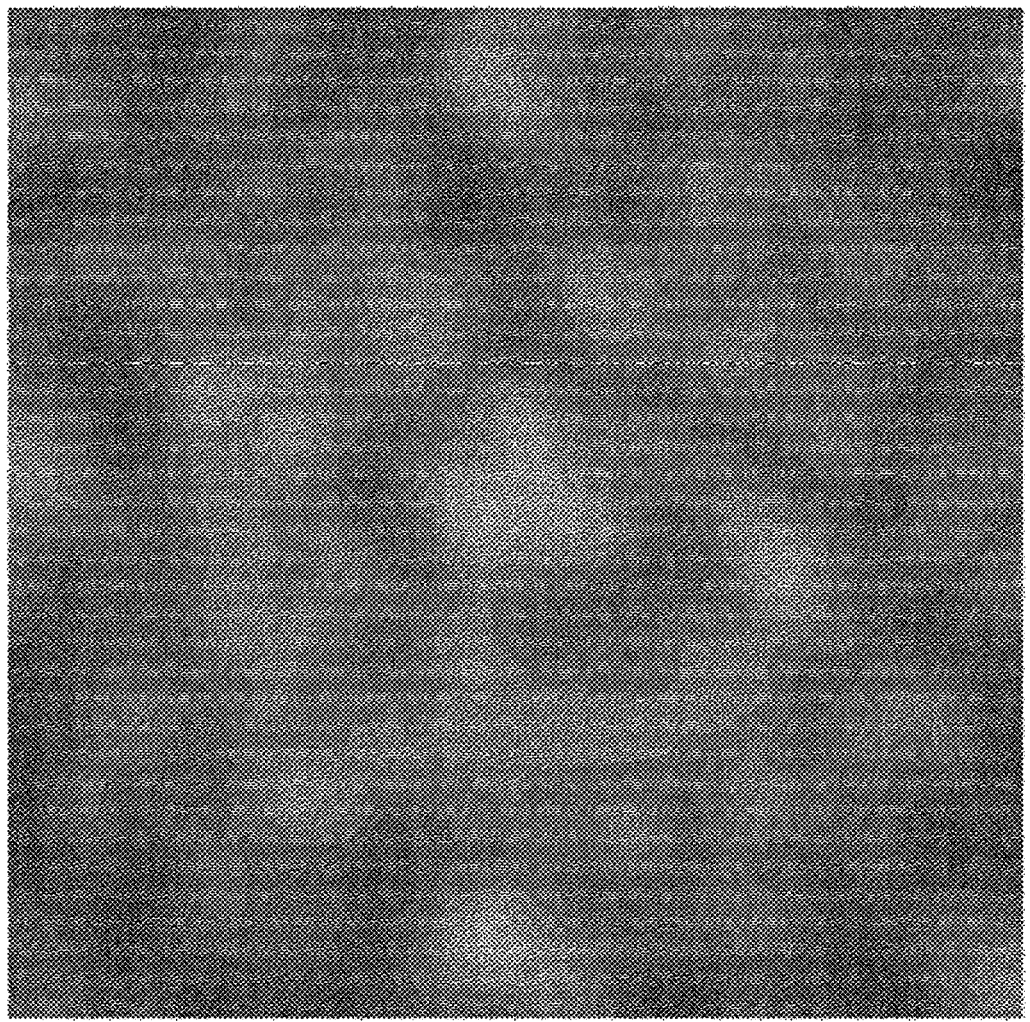
FIG. 27
BRIGHTNESS/RADIATION BRIGHTNESS W/sr mm²

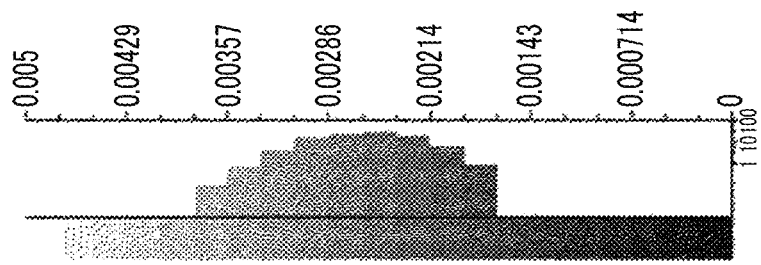
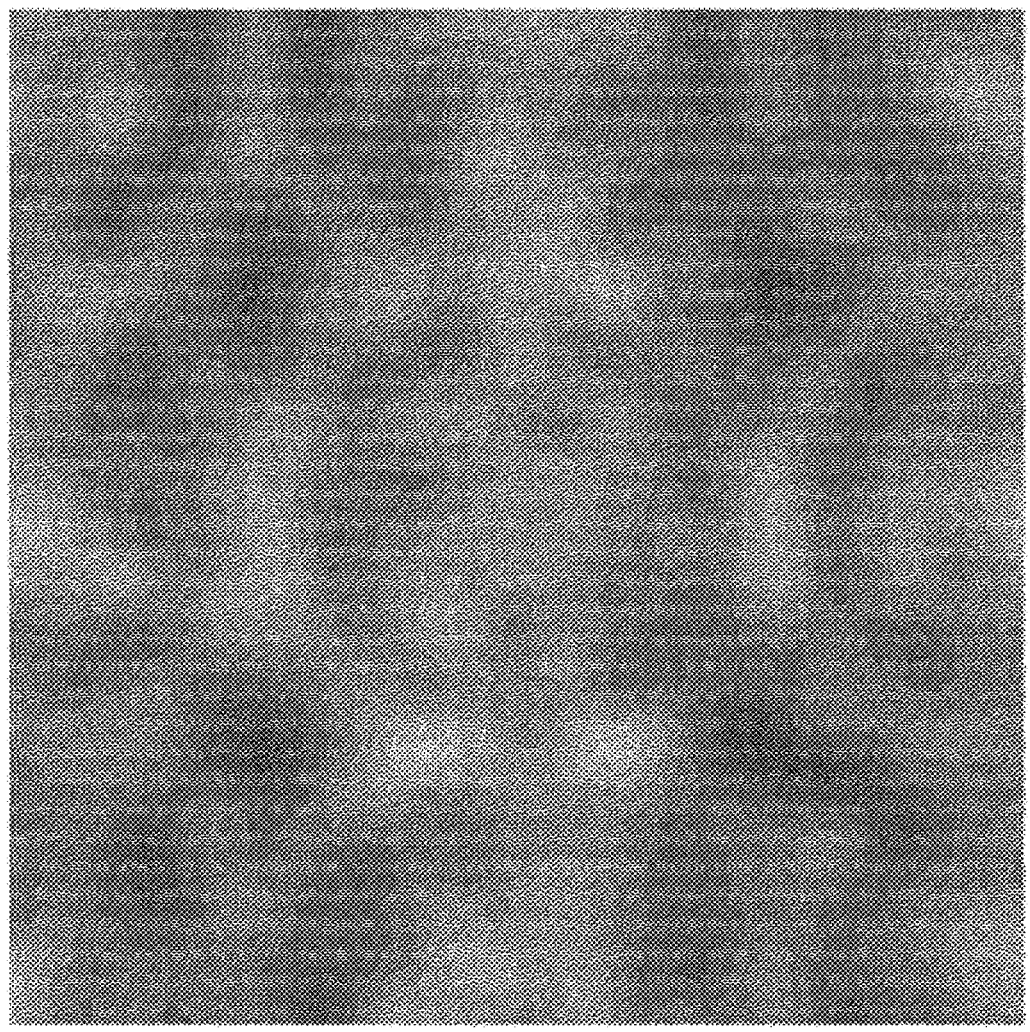
FIG. 28
BRIGHTNESS/RADIATION BRIGHTNESS W/sr mm²

FIG. 29
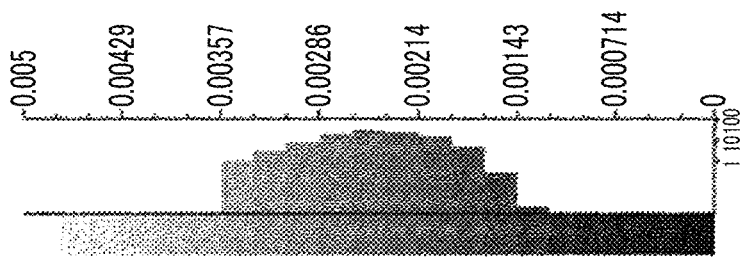
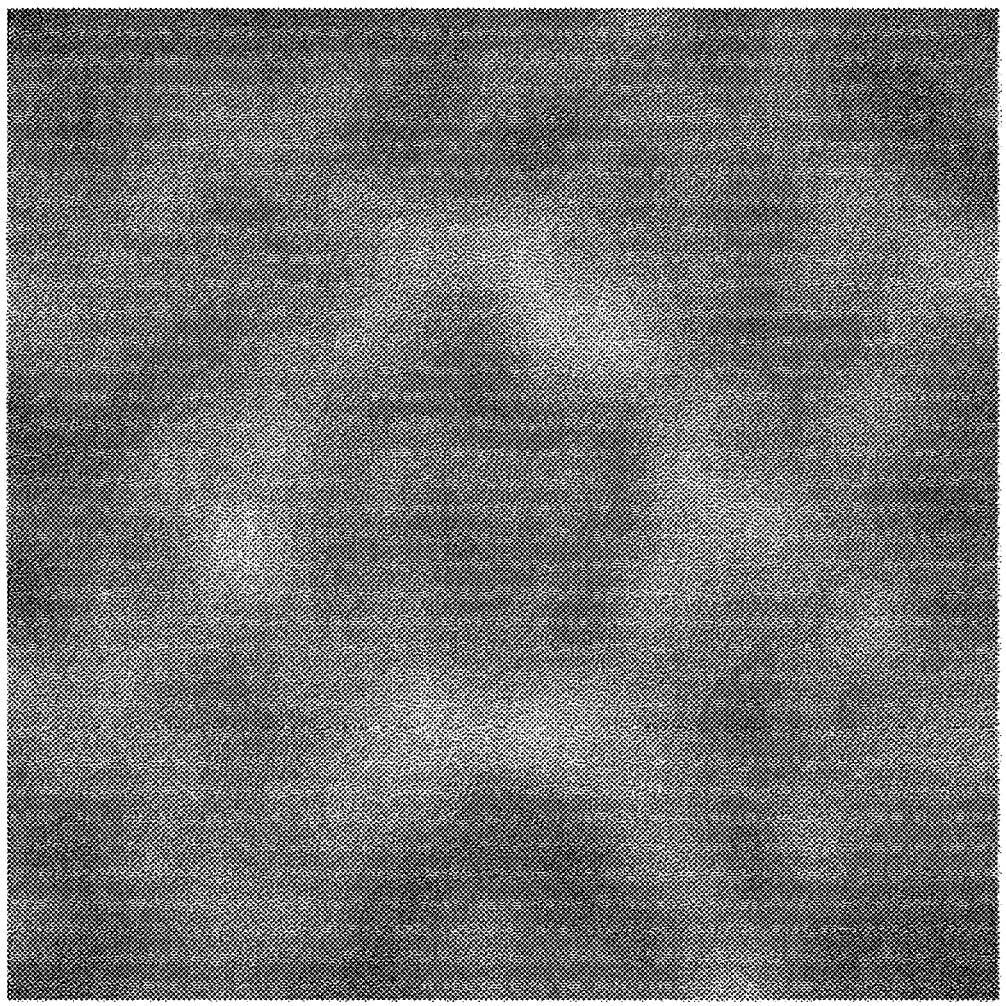

FIG. 30
BRIGHTNESS/RADIATION BRIGHTNESS W/sr mm²
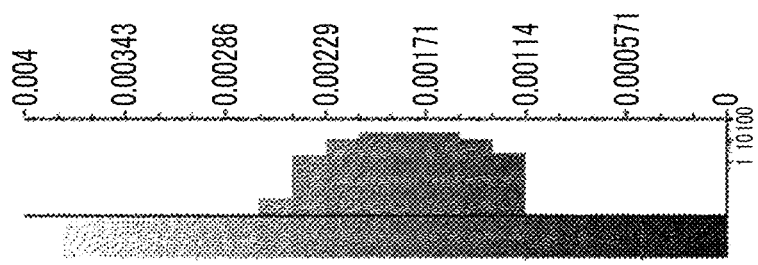
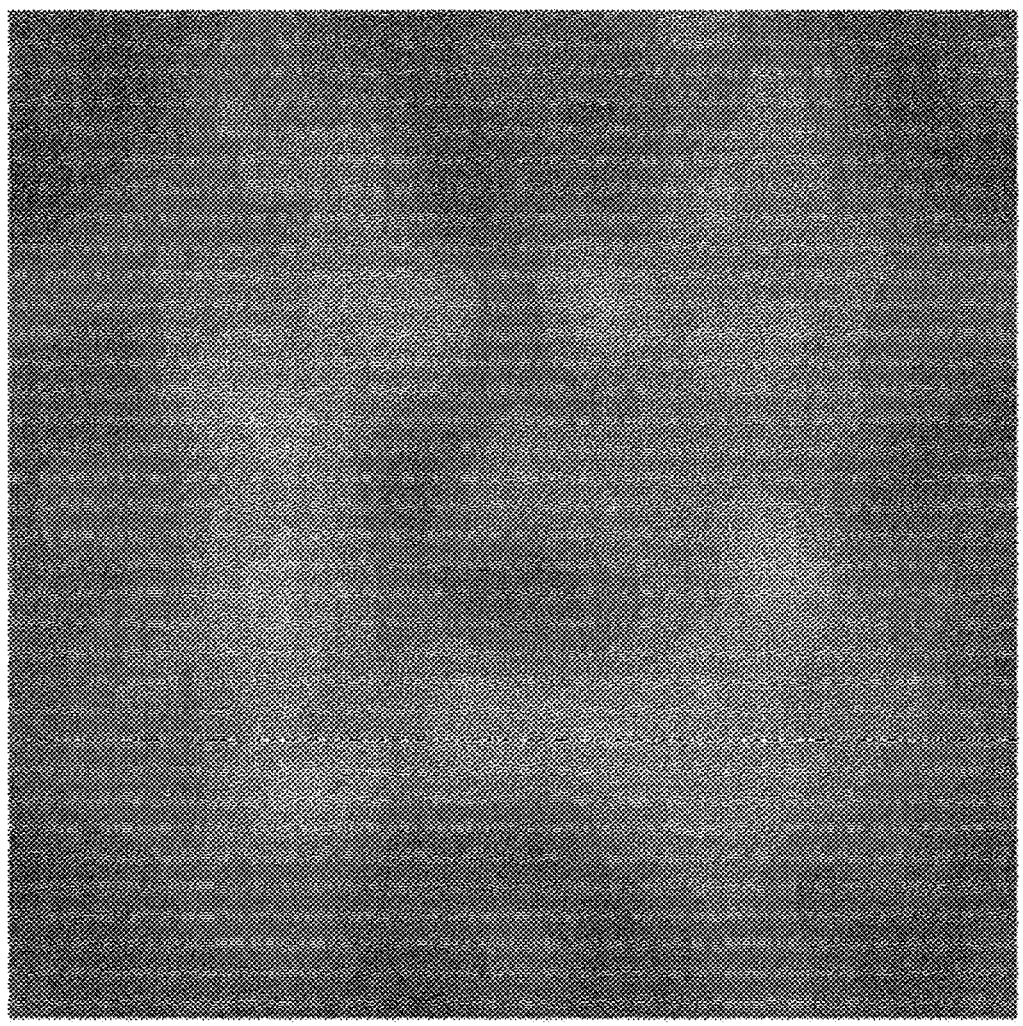

LIGHT SOURCE UNIT, DISPLAY DEVICE, AND LIGHT SOURCE UNIT MANUFACTURING APPARATUS

CROSS-REFERENCE TO RELATED APPLICATIONS

This application is a Continuation of PCT International Application No. PCT/JP2020/048120 filed on Dec. 23, 2020, which claims priority under 35 U.S.C. § 119(a) to Japanese Patent Application No. 2020-025054 filed on Feb. 18, 2020. The above application is hereby expressly incorporated by reference, in its entirety, into the present application.

BACKGROUND OF THE INVENTION

1. Field of the Invention

The present invention relates to a light source unit and a display device and particularly, to a light source unit and a display device designed by considering light distribution characteristics of a micro light source. In addition, the present invention relates to a light source unit manufacturing apparatus for manufacturing a light source unit.

2. Description of the Related Art

A light source unit used as a backlight of a display device such as a liquid crystal television is required to have evenness in brightness on a light emission surface in order to display a high-quality video. Examples of the light source unit of the related art capable of performing even light emission include the backlight disclosed in JP2018-37316A.

The backlight disclosed in JP2018-37316A is a direct type light emitting diode (LED) backlight. This LED backlight comprises a plurality of LED elements provided in a matrix on a substrate and a transmission and reflection plate provided to face the plurality of LED elements. The transmission and reflection plate includes a transmission portion through which a part of emitted light from the LED elements is transmitted, and a reflection portion that reflects a part of the emitted light. For example, the reflection portion is a cured layer of a thermosetting resin composition including a white pigment.

According to the backlight of the above configuration disclosed in JP2018-37316A, irradiation with light can be evenly performed by suppressing brightness unevenness on the light emission surface.

SUMMARY OF THE INVENTION

In the LED backlight of JP2018-37316A, while the cured layer as the reflection portion is provided in the transmission and reflection plate, a thickness, a shape, and the like of the cured layer are set in accordance with a distribution of intensity of the light (that is, light distribution characteristics) emitted from the LED elements. Here, in a case where the intensity distribution of the light is a steep (peaky) distribution, it is necessary to correspondingly form the shape of the cured layer as, for example, a steep mountain shape and increase the thickness in a top portion of the shape of the cured layer.

On the other hand, the light source unit that is the backlight of the display device is required to be thinner than products of the related art including the LED backlight of JP2018-37316A, and it is preferable to further decrease a thickness of a reflection pattern such as the cured layer.

The present invention is conceived in view of the above matter, and an aim thereof is to solve the following objects.

An object of the present invention is to solve problems of the technology in the related art and provide a light source unit and a display device that are further thinned while securing evenness in brightness on an emission surface. In addition, another object of the present invention is to provide a light source unit manufacturing apparatus for manufacturing the light source unit.

As a result of a comprehensive review for achieving the objects by the present inventors, it is perceived that a thickness of a reflection pattern formed on a first surface of a base arranged above an installation surface of a micro light source is decreased by forming a low reflection pattern around the micro light source.

Based on the above points, the present inventors have found thinning the light source unit while securing evenness in brightness on the light emission surface as an effect of providing the low reflection pattern around the micro light source, and have completed the present invention. That is, the present inventors have found that the above aim is solved by the following configurations.

[1] A light source unit comprising a light source installation surface on which at least one micro light source is installed, a base that is arranged with the light source installation surface and has a light-transmitting property, a reflection pattern that is formed on a first surface of the base positioned on a light source installation surface side based on light distribution characteristics of the at least one micro light source, and a low reflection pattern that is formed in a region of the light source installation surface positioned around the at least one micro light source based on the light distribution characteristics, in which a reflectivity in the region of the light source installation surface in which the low reflection pattern is formed is less than a reflectivity in a region other than the region in which the low reflection pattern is formed.

[2] The light source unit according to [1], in which an interval between a second surface of the base positioned on an opposite side to the first surface and the light source installation surface is greater than or equal to 1 mm and less than or equal to 4 mm.

[3] The light source unit according to [1] or [2], further comprising a substrate that includes the light source installation surface having a planar shape, in which a plurality of micro light emitting elements as the at least one micro light source are symmetrically arranged on the light source installation surface based on a center position of the light source installation surface.

[4] The light source unit according to any one of [1] to [3], in which a plurality of unit patterns constituting the reflection pattern are symmetrically formed on the first surface based on a center position of the first surface.

[5] The light source unit according to [4], in which each of the plurality of unit patterns is composed of titanium oxide.

[6] The light source unit according to [4] or [5], in which each of the plurality of unit patterns has a shape that protrudes toward the light source installation surface and has a diameter decreasing in a stepwise manner in a direction of approaching the light source installation surface.

[7] The light source unit according to any one of [4] to [6], in which each of the plurality of unit patterns is formed on the first surface such that an index value related to a distribution of brightness on a second surface of the base positioned on an opposite side to the first surface satisfies a set condition.

[8] The light source unit according to [7], in which the index value satisfies the set condition by satisfying a first condition and a second condition below, and a thickness, a size, and an arrangement position of each of the plurality of unit patterns are a thickness, a size, and an arrangement position decided to satisfy the first condition and the second condition, first condition: brightness is less than or equal to a reference value in each of a specific region present at a position overlapping with the at least one micro light source and a peripheral region surrounding the specific region on the second surface of the base positioned on the opposite side to the first surface, and second condition: a degree of dispersion of brightness on the second surface is within a target range.

[9] The light source unit according to [8], in which a size of the low reflection pattern is a size decided based on an evaluation value related to a distribution of brightness in a plane present at a position closer to the first surface than to the light source installation surface.

[10] The light source unit according to [9], in which the distribution of brightness on the second surface changes in accordance with the size of the low reflection pattern, and the thickness, the size, and the arrangement position of each of the plurality of unit patterns are a thickness, a size, and an arrangement position decided in accordance with the size of the low reflection pattern.

[11] The light source unit according to any one of [1] to [10], in which the base is composed of a film material having a light-transmitting property.

[12] The light source unit according to any one of [1] to [11], in which the base and the reflection pattern constitute a first light scattering body, and a second light scattering body in which a reflection pattern is not provided is arranged between the first light scattering body and the at least one micro light source.

[13] The light source unit according to [12], in which a deviation amount between a normal arrangement position of the first light scattering body with respect to the light source installation surface and an actual arrangement position of the first light scattering body is less than or equal to 0.2 mm in each of two directions that are parallel to the light source installation surface and are orthogonal to each other.

[14] A display device comprising a liquid crystal display, in which the light source unit according to any one of [1] to [13] is provided on a rear surface side of the liquid crystal display as a backlight unit.

[15] A light source unit manufacturing apparatus for manufacturing the light source unit according to any one of [1] to [13], the light source unit manufacturing apparatus comprising a light distribution characteristics acquisition device that acquires the light distribution characteristics of the at least one micro light source, and a pattern forming device that forms the reflection pattern on the first surface of the base and forms the low reflection pattern in the region of the light source installation surface positioned around the at least one micro light source in accordance with pattern forming data generated based on the acquired light distribution characteristics.

According to the present invention, a light source unit and a display device that are thinned while evenness in brightness on an emission surface is secured are implemented.

In addition, according to the present invention, an apparatus for manufacturing the light source unit can be provided.

BRIEF DESCRIPTION OF THE DRAWINGS

FIG. 25 is a diagram illustrating the distribution of brightness on the emission surface in Example 1.

FIG. 26 is a diagram illustrating the distribution of brightness on the emission surface in Example 2.

FIG. 27 is a diagram illustrating the distribution of brightness on the emission surface in Example 3.

FIG. 28 is a diagram illustrating the distribution of brightness on the emission surface in Comparative Example 1.

FIG. 29 is a diagram illustrating the distribution of brightness on the emission surface in Comparative Example 2.

FIG. 30 is a diagram illustrating the distribution of brightness on the emission surface in Comparative Example 3.

DESCRIPTION OF THE PREFERRED EMBODIMENTS

An embodiment (hereinafter, the present embodiment) of the present invention will be described in detail below with reference to a preferred embodiment illustrated in the appended drawings.

While apparatus configurations, applications, and usages described below are based on a representative embodiment of the present invention, the present invention is not limited to such an embodiment. That is, the present invention may be changed or improved from the embodiment described below without departing from the gist thereof. In addition, the present invention obviously includes equivalents thereof.

In the present specification, a numerical range represented using "to" means a range including numerical values disclosed before and after "to" as a lower limit value and an upper limit value.

In addition, in the present specification, it is assumed that "the same", "similar", and "identical" include not only a case of being completely identical but also a case where a slight difference is present, and the difference is within an error range generally allowed in the technical field of the present invention.

In addition, in the present specification, it is assumed that "all", "any", "entire surface", and the like includes not only a case of 100% but also an error range generally allowed in the technical field to which the present invention belongs, for example, including a case of greater than or equal to 99%, greater than or equal to 95%, or greater than or equal to 90%.

In addition, in the present specification, it is assumed that "parallel" includes not only a case of being parallel to a line, a surface, or a direction as a reference but also a case of being approximately parallel with an inclination of a few degrees.

Figure 1:
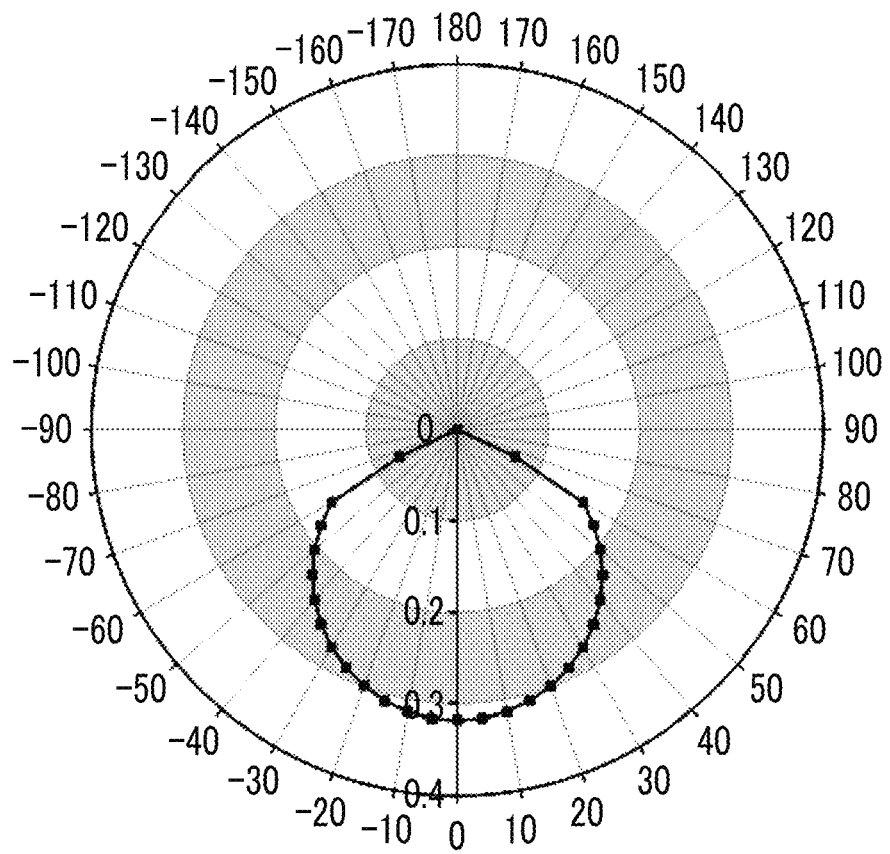
FIG. 1 is an example of a characteristics diagram illustrating light distribution characteristics.

In addition, in the following description, "light distribution characteristics" mean a degree of spreading of light from a light source and is a distribution of intensity (for example, radiant intensity or illuminance) in each direction from the light source. The light distribution characteristics are normally represented by a characteristics diagram as illustrated in FIG. 1. In the characteristics diagram, intensity of emitted light in a direction in which the intensity is the maximum is represented as 100%, and the intensity of the emitted light in each direction is represented as a relative value (ratio).

Light distribution is categorized into far field light distribution measured from an infinite distance at which the light source is viewed as a point, and near field light distribution measured from a distance at which distributions of light exiting from various points in the light source can be distinguished. Hereinafter, it is assumed that the light distribution means the far field light distribution unless otherwise specified.

In addition, in the following description, it is assumed that "reflection" means diffuse-reflection (diffuse reflection) and is synonymous with diffusion unless otherwise specified.

[Summary of Display Device According to Present Embodiment]

Figure 2:
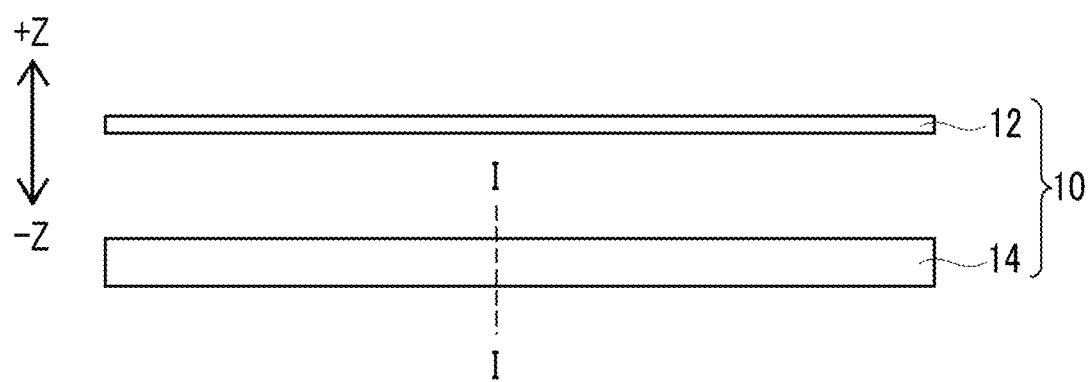
FIG. 2 is a schematic side view of constituents of a display device.

As illustrated in FIG. 2, a display device 10 according to the present embodiment includes a liquid crystal display (hereinafter, referred to as the LCD) 12 that displays an image, and a light source unit 14 arranged on a rear surface side of the LCD 12.

The LCD 12 functions as an image display panel. A display screen of the LCD 12 is irradiated with light from the light source unit 14 from the rear surface side of the LCD 12.

Figure 3:
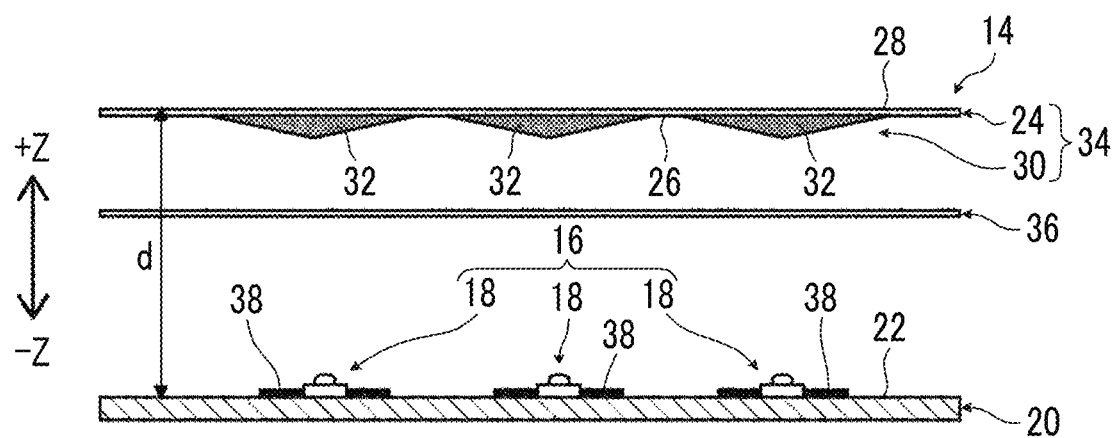
FIG. 3 is a diagram illustrating a configuration example of a light source unit and illustrates I-I cross section of FIG. 2.

The light source unit 14 is comprised in the display device 10 as a direct type backlight unit and is a planar lighting device of which a surface facing an LCD 12 side is an emission surface. As illustrated in FIG. 3, the light source unit 14 includes a light source installation surface 22 on which at least one micro light source 16 is installed, and a first light scattering body 34.

The first light scattering body 34 includes a base 24 that is arranged with the light source installation surface 22 and has a light-transmitting property, and comprises a reflection pattern 30 that is formed on a first surface 26 positioned on a light source installation surface 22 side of the base 24 based on light distribution characteristics of at least one micro light source 16. As illustrated in FIG. 3, the reflection pattern 30 is composed of a plurality of unit patterns 32. Each unit pattern 32 has an approximately mountain shape of which a thickness is increased toward a center portion as illustrated in the same drawing.

In the cross-sectional view illustrated in FIG. 3, the number of each of the micro light source 16 and the unit patterns 32 is different from the actual number thereof for simplification of illustration.

In addition, as illustrated in FIG. 3, a low reflection pattern 38 that is formed based on the light distribution characteristics of at least one micro light source 16 is provided in a region of the light source installation surface 22 positioned around at least one micro light source 16.

A reflectivity in the region of the light source installation surface 22 in which the low reflection pattern 38 is formed is less than a reflectivity in the other region. For example, while the reflectivity in the former region is approximately 0.1%, the reflectivity in the latter region is approximately 90%. The reflectivity can be measured using a well-known measuring method, for example, a method using a well-known spectroscopic measuring device.

With the above configuration, it is possible to thin the light source unit 14 and the display device 10 while securing evenness in brightness on the emission surface in the present embodiment.

Effects of the present embodiment will be described with reference to FIG. 4 to FIG. 8.

Examples of a general method of securing the evenness in brightness on the emission surface (in a strict sense, a second surface 28 of the base 24 described later) of the light include forming the reflection pattern 30 on the first surface 26 of the base 24.

On the other hand, thicknesses of the light source unit 14 and the display device 10 are decided in accordance with an interval (in FIG. 3, denoted by symbol d) between the second surface 28 positioned on the opposite side to the first surface 26 in the base 24 and the light source installation surface 22.

Figure 4:
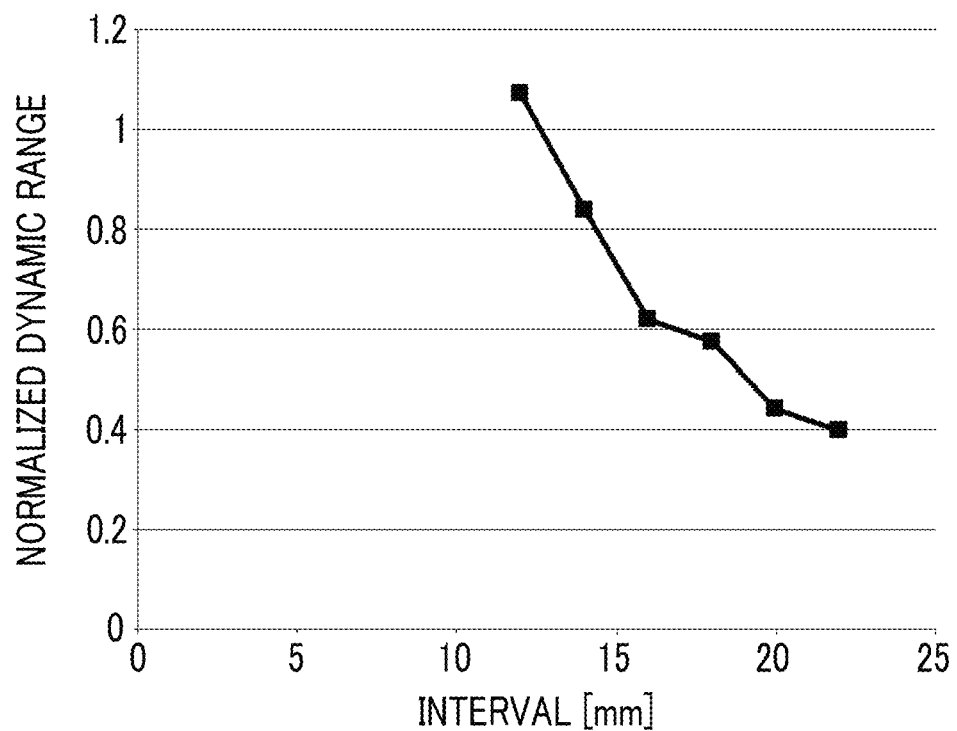
FIG. 4 is a graph illustrating an index value related to evenness in brightness on an emission surface in a case where a reflection pattern is not provided in a base (Part 1).
Figure 5:
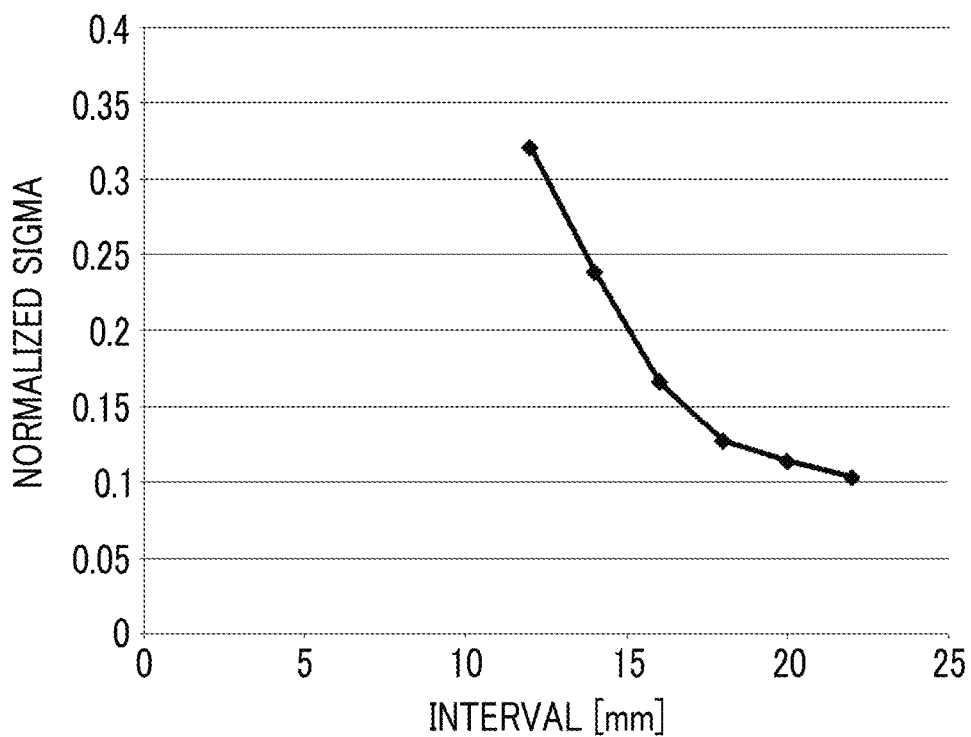
FIG. 5 is a graph illustrating the index value related to the evenness in brightness on the emission surface in a case where the reflection pattern is not provided in the base (Part 2).

Here, in a case where the reflection pattern 30 is not provided in the base 24, an index value related to a distribution of brightness on the emission surface (that is, the second surface 28) changes in response to a change in the interval d based on the behaviors illustrated in FIGS. 4 and 5.

The index value (a numerical value on a vertical axis) illustrated in FIG. 4 is a value obtained by dividing a difference between a maximum point and a minimum point on the distribution (histogram) of brightness on the second surface 28 by an average value of brightness. Hereinafter, the index value will be referred to as a "normalized dynamic range" for convenience. The maximum point of the distribution of brightness is a point corresponding to 97% of a cumulative histogram, and the minimum point corresponds to 3% of the cumulative histogram.

The index value (a numerical value on a vertical axis) illustrated in FIG. 5 is a value obtained by dividing a standard deviation (sigma) calculated from a two-dimensional distribution of brightness on the second surface 28 by the average value of brightness. Hereinafter, the index value will be referred to as a "normalized sigma" for convenience.

Both of the normalized dynamic range and the normalized sigma are decreased as the evenness of the distribution of brightness is increased.

In a case where the reflection pattern 30 is not provided in the base 24, as is perceived from FIGS. 4 and 5, the interval d needs to be relatively increased (for example, in the cases illustrated in FIGS. 4 and 5, exceeds 15 mm) in order to secure the evenness in brightness.

Figure 6:
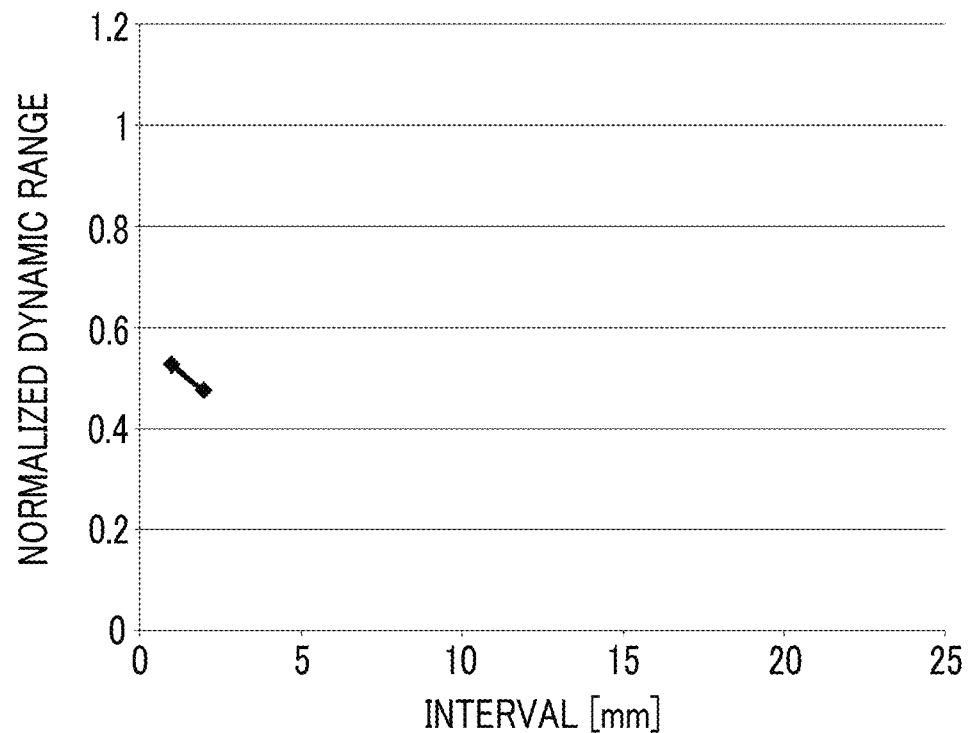
FIG. 6 is a graph illustrating the index value related to the evenness in brightness on the emission surface in a case where the reflection pattern is provided in the base (Part 1).
Figure 7:
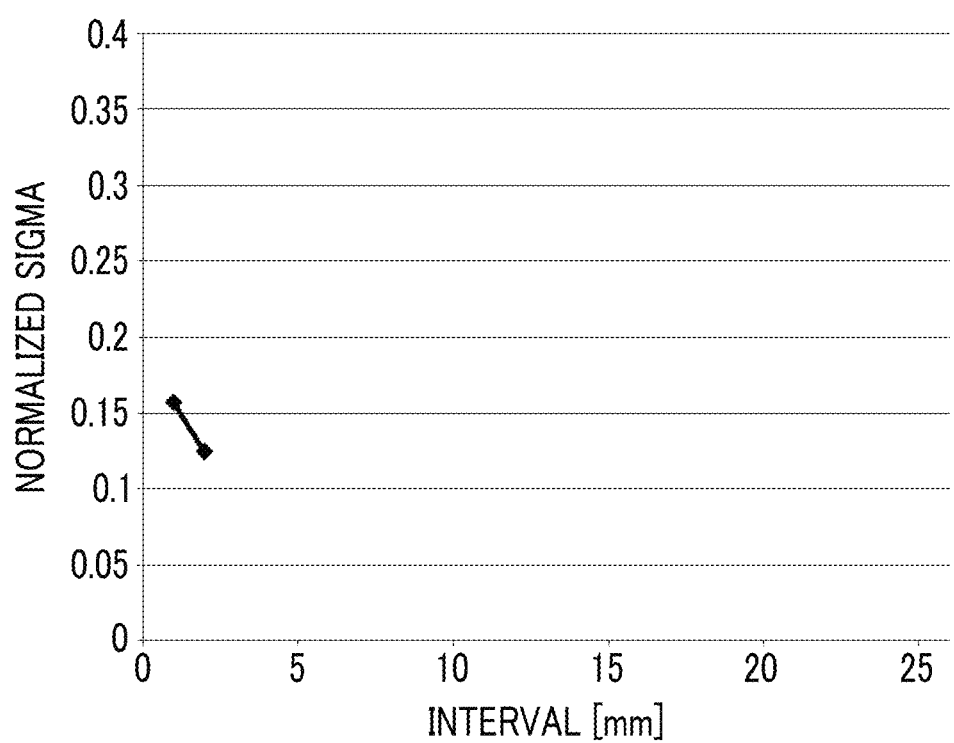
FIG. 7 is a graph illustrating the index value related to the evenness in brightness on the emission surface in a case where the reflection pattern is provided in the base (Part 2).

On the other hand, in a case where the reflection pattern 30 is formed on the first surface 26 of the base 24, the same degree of evenness in brightness as in a case where the interval d is large can be secured even in a case where the interval d is decreased (in the cases illustrated in FIGS. 6 and 7, 1.0 mm to 2.0 mm) as illustrated in FIGS. 6 and 7.

In a case where the reflection pattern 30 is provided in order to secure the evenness in brightness, shapes of the plurality of unit patterns 32 forming the reflection pattern 30 need to be appropriately decided. Specifically, a thickness of each part of the unit pattern 32 is decided in accordance with the intensity distribution of the light emitted toward the unit pattern 32 from the micro light source 16.

Figure 8:
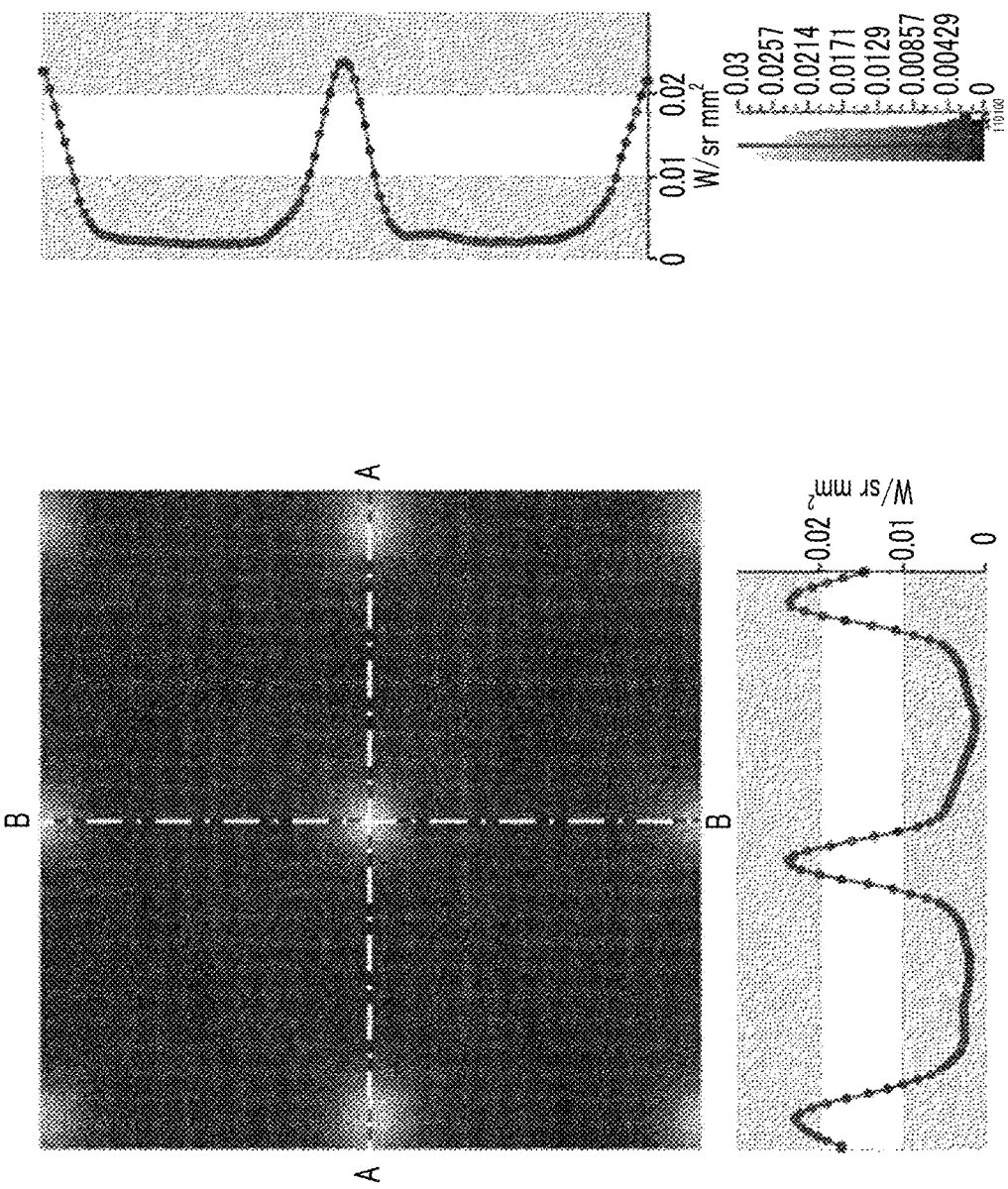
FIG. 8 is a diagram illustrating a distribution of brightness on a predetermined surface in a case where a low reflection pattern is not provided on a light source installation surface.

Depending on the light distribution characteristics of the micro light source 16, the intensity distribution of the light on a predetermined surface results in a steep (peaky) distribution as illustrated in FIG. 8, and intensity at a peak (peak intensity) of the distribution tends to be relatively increased. Here, the predetermined surface is a plane that is present at a position closer to the first surface 26 than to the light source installation surface 22 between the light source installation surface 22 and the first surface 26. For example, the predetermined surface is a surface of a second light scattering body 36, described later, that faces toward a first surface 26 side. In addition, the peak intensity is the intensity of the light at a position overlapping with the micro light source 16 (that is, a position immediately above the micro light source 16) on the predetermined surface.

Figure 9:
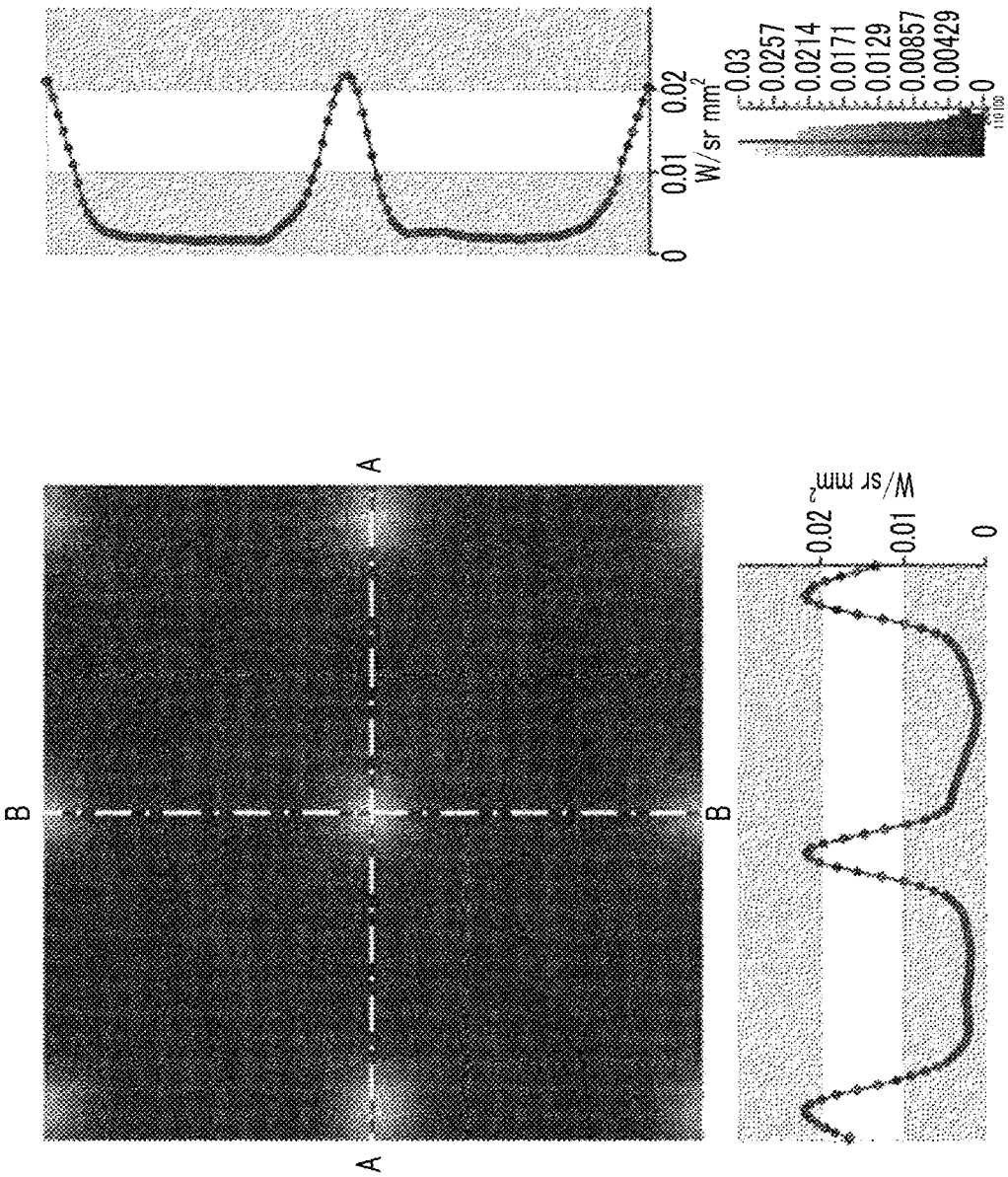
FIG. 9 is a diagram illustrating the distribution of brightness on the predetermined surface in a case where the low reflection pattern is provided on the light source installation surface.

FIGS. 8 and 9 are diagrams illustrating the intensity distribution of the light on the predetermined surface (in a strict sense, the surface of the second light scattering body 36 facing toward the first surface 26 side). In each of FIGS. 8 and 9, an upper left graph illustrates a two-dimensional distribution of brightness and visualizes a magnitude of brightness using white and black shades. Lower left and upper right graphs illustrate one-dimensional distributions of brightness within ranges corresponding to A-A line and B-B line in FIGS. 8 and 9. A lower right graph is a histogram representing evenness (smoothness) of a brightness distribution.

In a case where the intensity distribution of the light on the predetermined surface is steep, and the peak intensity is increased, generally, the thickness of the unit pattern 32 having an approximately mountain shape is increased in order to achieve even intensity of the light on the light emission surface. However, as the thickness of the unit pattern 32 is increased, the thicknesses of the light source unit 14 and the display device 10 are increased.

On the other hand, in the present embodiment, the low reflection pattern 38 is provided in the region positioned around the micro light source 16 on the light source installation surface 22. Accordingly, in a case where the light emitted from the micro light source 16 is reflected by the reflection pattern 30 to return to the light source installation surface 22 side, the light that heads toward the first light scattering body 34 by further reflection is reduced by the low reflection pattern 38. Consequently, as illustrated in FIG. 9, a peak value (peak intensity) in the intensity distribution of the light on the predetermined surface is decreased.

The decrease in peak intensity enables the thickness of each part of the unit pattern 32 to be further decreased. Particularly, a thickness of a pattern center part of the unit pattern 32 that is at a position immediately above the micro light source 16 and is the thickest can be decreased. Accordingly, the light source unit 14 and the display device 10 are further thinned.

In addition, the decrease in thickness of each part of the unit pattern 32 further facilitates forming (patterning) of the unit pattern 32. That is, in the present embodiment, providing the low reflection pattern 38 decreases a degree of difficulty in manufacturing the first light scattering body 34 including patterning.

Figure 10:
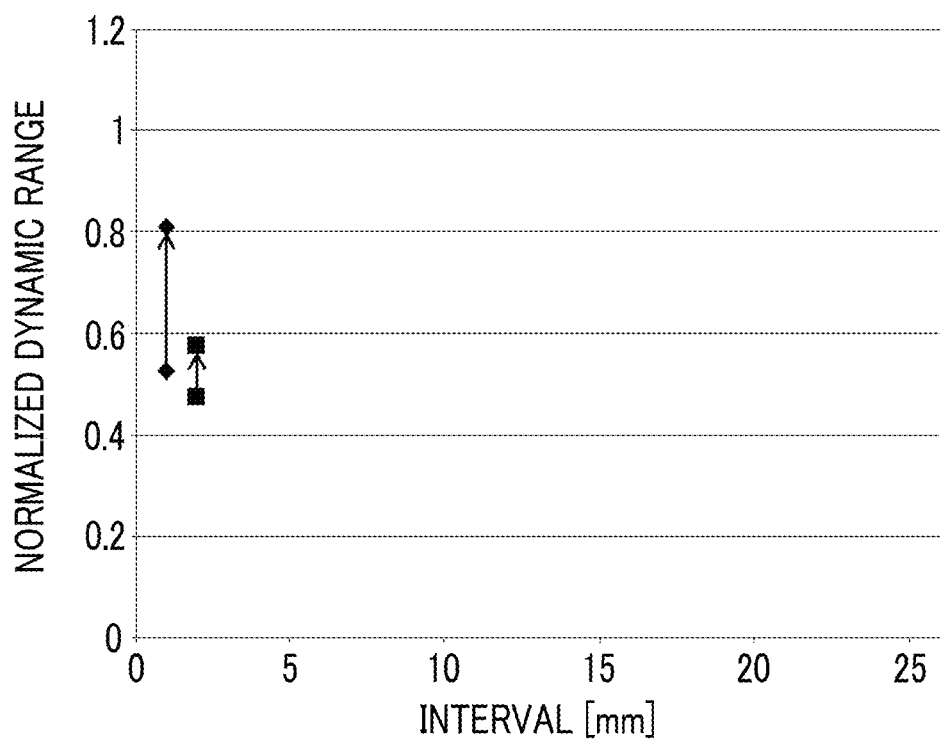
FIG. 10 is a diagram illustrating a change in the index value related to the evenness in brightness on the emission surface in a case where an arrangement position of a first light scattering body deviates (Part 1).
Figure 11:
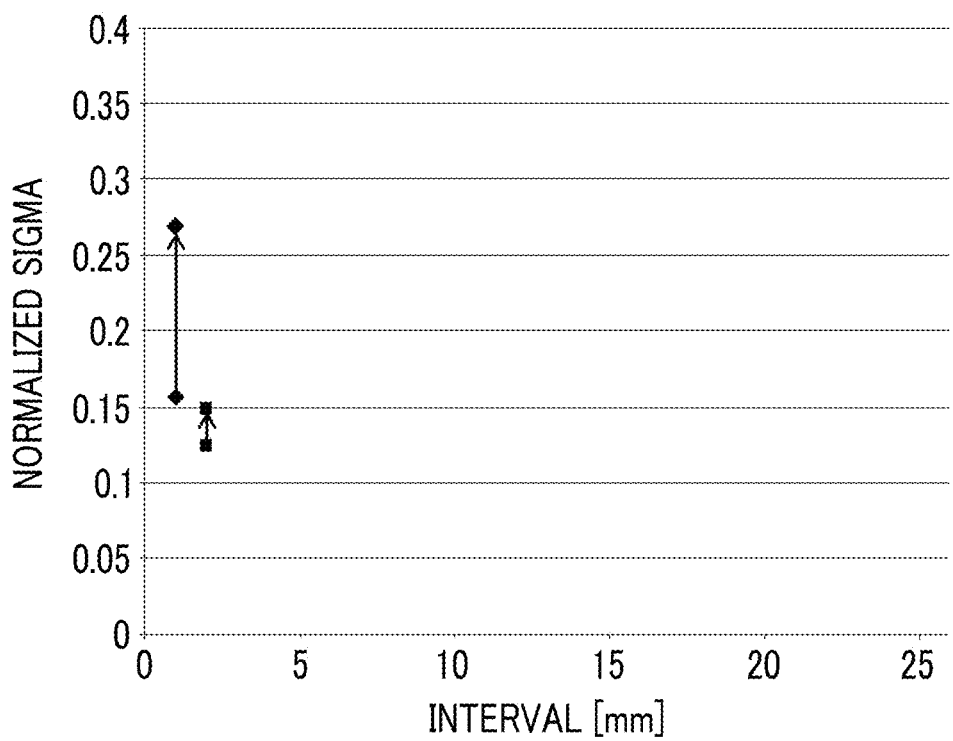
FIG. 11 is a diagram illustrating the change in the index value related to the evenness in brightness on the emission surface in a case where the arrangement position of the first light scattering body deviates (Part 2).

In a configuration in which the first light scattering body 34 composed of the base 24 and the reflection pattern 30 is provided, in a case where an arrangement position of the first light scattering body 34 deviates from a normal position, the evenness in brightness is decreased as illustrated in FIGS. 10 and 11. That is, an effect of achieving even brightness on the emission surface by the reflection pattern 30 of the first light scattering body 34 is affected by a slight deviation of the arrangement position of the first light scattering body 34 as in shading correction of a printer.

FIGS. 10 and 11 represent a change in the index value in a case where the arrangement position of the first light scattering body 34 deviates (in a strict sense, in a case where the arrangement position deviates by 0.2 mm in X and Y directions described later). FIG. 10 illustrates a change in the normalized dynamic range, and FIG. 11 illustrates a change in the normalized sigma. In the cases illustrated in FIGS. 10 and 11, the deviation of the arrangement position of the first light scattering body 34 increases the index value in directions of the arrows in FIGS. 10 and 11.

In the present embodiment, as illustrated in FIG. 3, the second light scattering body 36 in which a reflection pattern is not provided is arranged between the first light scattering body 34 and at least one micro light source 16. Arranging the second light scattering body 36 increases robustness (tolerance) to the deviation of the arrangement position of the first light scattering body 34.

Figure 12:
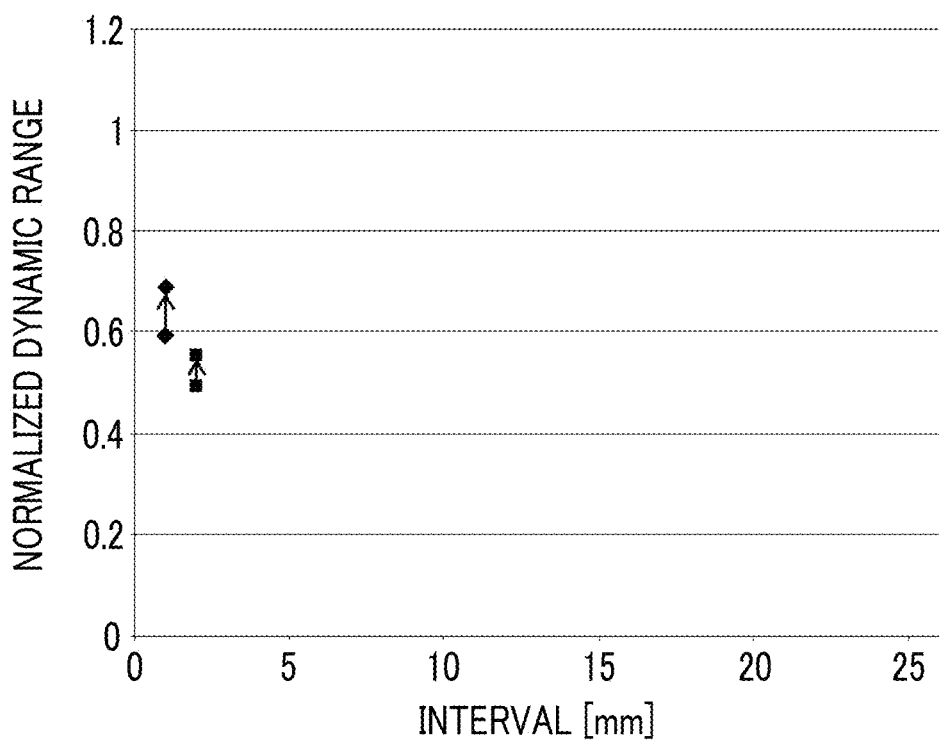
FIG. 12 is a diagram illustrating the change in the index value related to the evenness in brightness on the emission surface in a case where a second light scattering body is further comprised (Part 1).
Figure 13:
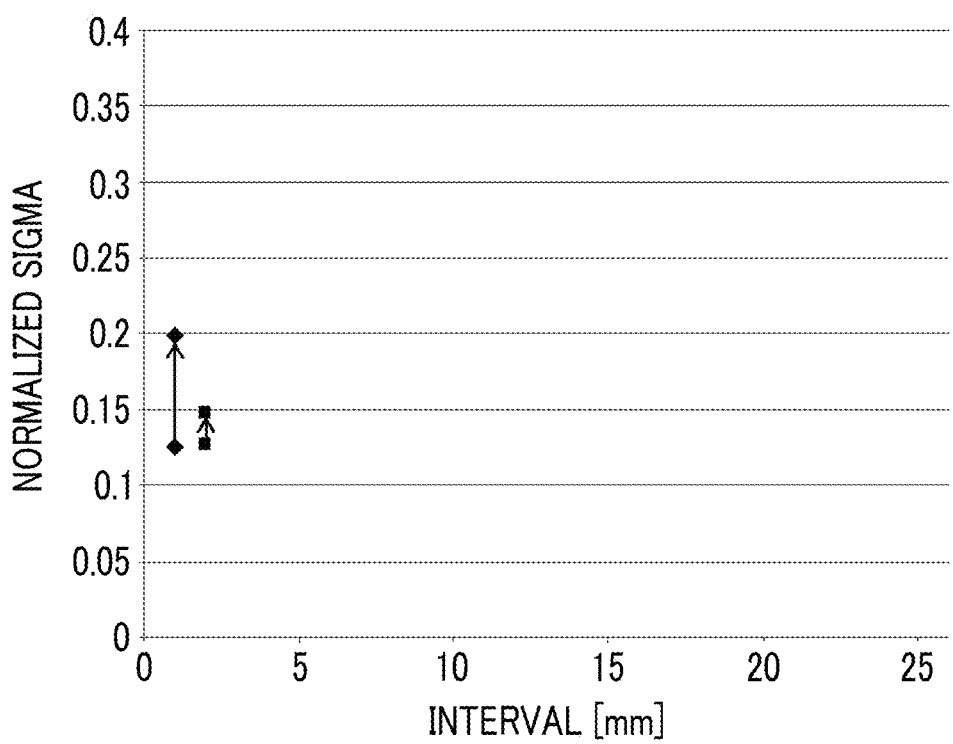
FIG. 13 is a diagram illustrating the change in the index value related to the evenness in brightness on the emission surface in a case where the second light scattering body is further comprised (Part 2).

More specifically, combining the second light scattering body 36 with the first light scattering body 34 can further alleviate the decrease in evenness of brightness in the deviation of the arrangement position of the first light scattering body 34 as illustrated in FIGS. 12 and 13, compared to a case of not providing the second light scattering body 36. An effect of providing the second light scattering body 36 is particularly effective in a case where light distribution intensity from the micro light source 16 is increased within a limited range (that is, peaky light distribution characteristics).

FIGS. 12 and 13 represent a change in the index value in a case where an arrangement position of the base 24 deviates under a similar condition to FIGS. 10 and 11 except that the second light scattering body 36 is comprised.

A deviation amount of the arrangement position of the first light scattering body 34 that may be allowed in a case of using the second light scattering body 36 may be less than or equal to 0.2 mm in each of the X and Y directions. The X and Y directions correspond to two directions that are parallel to the light source installation surface 22 and are orthogonal to each other. The deviation amount is a deviation amount between a normal arrangement position of the first light scattering body 34 with respect to the light source installation surface 22 and the actual arrangement position of the first light scattering body 34.

[Configuration Example of Light Source Unit According to Present Embodiment]

As illustrated in FIG. 3, the light source unit 14 according to the present embodiment comprises a substrate 20 in which the micro light source 16 is installed, the first light scattering body 34 including the reflection pattern 30, the low reflection pattern 38 formed on the light source installation surface 22, and the second light scattering body 36.

Hereinafter, each constituent of the light source unit 14 will be described.

(Micro Light Source)

The micro light source 16 is a point light source having strong directivity. In the present embodiment, the micro light source 16 is composed of a micro light emitting element 18 illustrated in FIG. 3. Specifically, the micro light source 16 consists of a light emitting diode (LED) referred to as a mini LED of which a chip size is 100 to 200 µm.

However, the type of micro light source 16 is not limited to the mini LED. For example, a micro LED of which a chip size is less than or equal to 100 µm may be used. Alternatively, a micro light emitting element other than the LED, specifically, a micro electroluminescence element or a micro semiconductor laser, may be used.

In a case where the light distribution characteristics of the micro light emitting element 18 (that is, the mini LED) of the present embodiment is described, a viewing angle when a direction in which the intensity of the light is the highest among emission directions of the light is 0 degrees is approximately ±65 to ±80 degrees (that is, a range of approximately 130 to 160 degrees). The brightness at 0 degrees (that is the maximum brightness) is not important in the establishment of the present invention and is not particularly limited.

In addition, a light diffusion type lens (not illustrated) may be mounted in the micro light emitting element 18. The light diffusion type lens is a lens of a light diffusion type, for example, an aspheric lens, that diffuses light emitted from the mini LED. A well-known lens member (for example, the lens member disclosed in JP2013-12417A) that may accomplish a desired light diffusion effect can be appropriately used. Mounting such a light diffusion type lens in the micro light emitting element 18 can provide the light source unit 14 that has higher brightness and also excellent evenness in brightness on the emission surface.

(Substrate)

The substrate 20 is a planar member and is a rigid substrate, a flexible substrate, or a rigid flexible substrate that is normally used as the backlight unit of the LCD 12. In addition, the substrate 20 includes a flat plate base layer, not illustrated, and includes the light source installation surface 22 on a side of the base layer on which the LCD 12 is positioned. A material of the base layer is not particularly restricted. Examples of the material include a material obtained by an advanced grade solid-bump process (AGSP), alumina, glass epoxy, and polychlorinated biphenyl (PCB). Particularly, a material having a high thermal conductivity is preferred.

A metal wiring part, not illustrated, is formed on the light source installation surface 22. A plurality of micro light emitting elements 18 (for example, mini LEDs) as at least one micro light source 16 are installed on the light source installation surface 22 through the metal wiring part. In the present embodiment, the plurality of micro light emitting elements 18 are regularly and symmetrically arranged based on a center position of the light source installation surface 22. For example, the plurality of micro light emitting elements 18 are arranged in a matrix at an interval of 5 to 6 mm in the X and Y directions from the center position of the light source installation surface 22.

For example, in a case where the light source installation surface 22 has an oblong shape or a square shape, a position of an intersection between diagonal lines corresponds to the center position of the light source installation surface 22. In a case where the light source installation surface 22 is a circle, a center of the circle corresponds to the center position of the light source installation surface 22.

In addition, in the region of the light source installation surface 22 positioned around the micro light emitting element 18 which is the micro light source 16, the low reflection pattern 38 is provided, and the reflectivity in the region (hereinafter, a pattern forming region) is less than the reflectivity in the other region (hereinafter, non-pattern forming region).

The non-pattern forming region of the light source installation surface 22 may be covered with a reflective layer having a high reflectivity. In addition, the base layer of the substrate 20 may be composed of a material having a light diffusion property, for example, a light diffusion film, and the base layer may be exposed in the non-pattern forming region. In this case, the reflective layer does not need to be separately provided on the base layer.

(First Light Scattering Body)

The first light scattering body 34 is composed of a reflective type transmissive body and, as illustrated in FIG. 3, includes the transparent or semi-transparent base 24 having a light-transmitting property and the reflection pattern 30 formed on a surface of the base 24.

(Base)

The base 24 consists of a film material having a light-transmitting property. The base 24 may be any of a transparent base, a semi-transparent base, and other bases having a light diffusion property as long as light is transmitted through the base 24.

As illustrated in FIG. 3, the base 24 is arranged in parallel with the light source installation surface 22 of the substrate 20. The normal arrangement position of the base 24 with respect to the light source installation surface 22 is a position when a center position of the base 24 matches the center position of the light source installation surface 22 in the X and Y directions, and an extending direction of the base 24 matches an extending direction of the light source installation surface 22.

For example, in a case where the surface of the base 24 has an oblong shape or a square shape, a position of an intersection between diagonal lines corresponds to the center position of the base 24. In a case where the surface of the base 24 is a circle, a center position of the circle corresponds to the center position of the base 24.

Examples of the film material constituting the base 24 include polyester-based resin such as polyethylene terephthalate (PET), polyethylene naphthalate (PEN), and polylactic acid (PLA); cellulose-based resin such as cellulose triacetate; polyolefin-based resin such as polyethylene (PE), polypropylene (PP), and cycloolefin-based (COC and COP) resin; acrylic-based resin such as polymethylmethacrate (PMMA); polycarbonate (PC) resin; and fluorocarbon-based resin such as polytetrafluoroethylene (PTFE).

In addition, the base 24 may consist of one layer or may consist of two or more layers. For example, the base 24 consisting of a plurality of layers may include a layer consisting of a light diffusion film.

A reflective layer (not illustrated) of the same material as the reflection pattern 30 is provided on a side of the base 24 of the present embodiment on which the micro light source 16 is positioned. This reflective layer is a layer that has an even and sufficiently small thickness.

In addition, in a case of using a transparent film as the base 24, a transmittance (in a strict sense, an average ray transmittance in a luminescence wavelength range of the micro light source 16) of the base 24 is preferably greater than or equal to 50%, more preferably greater than or equal to 70%, and particularly preferably greater than or equal to 85%.

In addition, the base 24 may have a light diffusion property. For example, the base 24 may be provided with a light diffusion property by forming a rough shape or a prism shape on at least one surface of the base 24. In addition, the base 24 may be provided with a light diffusion property by dispersing inorganic fine particles or organic fine particles inside the base 24.

In addition, a refractive index of the base 24 is preferably 1.00 to 2.00 and more preferably 1.30 to 1.80 from a relationship between the refractive index of the base 24 and a refractive index of air, so that an incidence angle of a ray transmitted through the base 24 is not excessively restricted.

Here, a thickness direction of the base 24, that is, a direction in which the base 24 and the light source installation surface 22 are arranged, is referred to as a Z direction. In a view from the base 24, a side on which the LCD 12 is positioned is referred to as a +Z side, and a side on which the light source installation surface 22 is positioned is referred to as a −Z side. The surface of the base 24 on the −Z side is the first surface 26. As described above, the reflection pattern 30 is formed on the first surface 26. In addition, the surface of the base 24 on the +Z side is the second surface 28. For example, the second surface 28 faces a rear surface of the LCD 12. In the present embodiment, the second surface 28 constitutes the light emission surface of the light source unit 14.

In addition, from a viewpoint of achieving even brightness on the second surface 28, the interval d between the second surface 28 and the light source installation surface 22 is preferably 1 mm to 4 mm and more preferably greater than or equal to 1 mm and less than 2 mm.

(Reflection Pattern)

The reflection pattern 30 is formed (patterned) on the first surface 26 of the base 24 and reflects an incidence ray (in a strict sense, light transmitted through the second light scattering body 36) from the plurality of micro light emitting elements 18. The base 24 is laminated with the reflection pattern 30 on the −Z side of the base 24.

Figure 14:
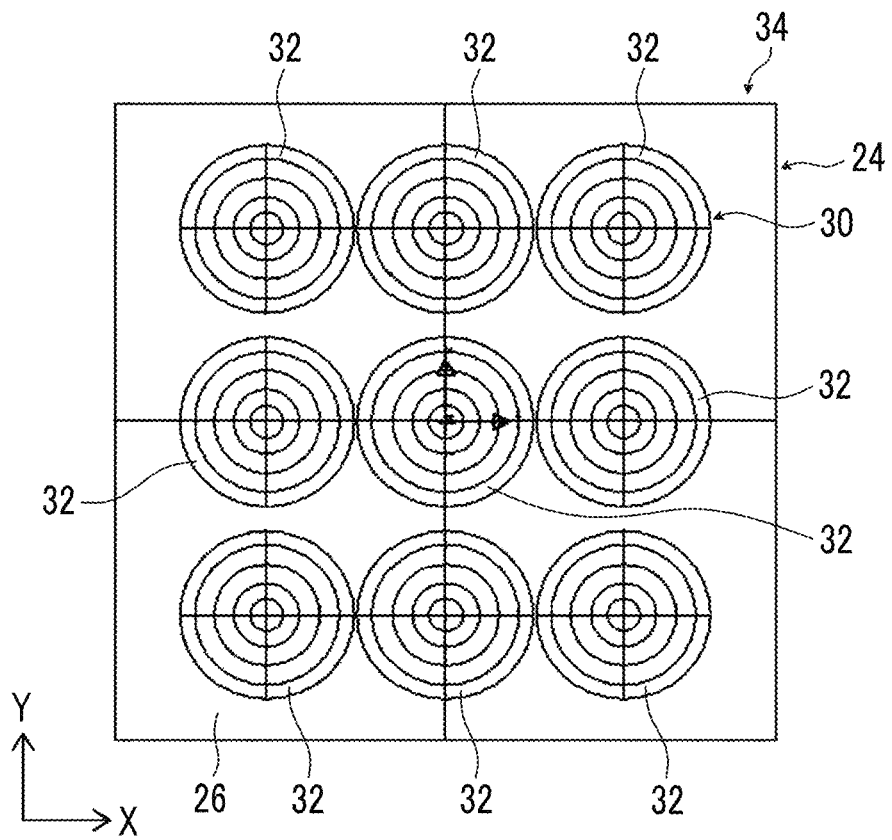
FIG. 14 is a schematic plan view of the first light scattering body.

In the present embodiment, for example, the reflection pattern 30 is composed of the same number of unit patterns 32 as the micro light emitting elements 18 as illustrated in FIG. 14.

In the reflection pattern 30 illustrated in FIG. 14, the number of unit patterns 32 is different from the actual number thereof for convenience of illustration.

In addition, the plurality of unit patterns 32 are regularly and symmetrically arranged based on a center position of the first surface 26. Specifically, the unit patterns 32 are formed at an equal pitch in each of the X and Y directions from the center position of the first surface 26. Here, the pitch of the unit patterns 32 on the first surface 26 is identical or approximately equal to a pitch of the micro light emitting elements 18 on the light source installation surface 22. Accordingly, as illustrated in FIG. 3, each unit pattern 32 is positioned immediately above each micro light emitting element 18 in a state where the base 24 is at the normal arrangement position.

Figure 15:
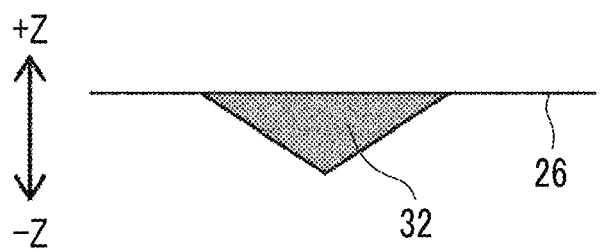
FIG. 15 is a side view of a unit pattern of the reflection pattern.

In addition, as illustrated in FIG. 15, each unit pattern 32 is a pattern having an approximately mountain shape. In a strict sense, each unit pattern 32 is a pattern having an approximately conical shape having a relatively wide base. That is, in the present embodiment, the unit pattern 32 has a shape that protrudes toward the light source installation surface 22 and has a diameter which is decreased in a stepwise manner in a direction of approaching the light source installation surface 22.

Figure 16:
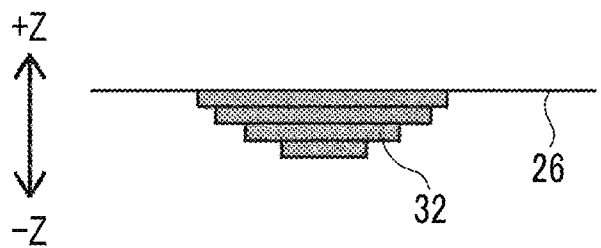
FIG. 16 is a diagram illustrating a modification example of the unit pattern of the reflection pattern.

Each unit pattern 32 may have a tapered shape of which a diameter is gradually reduced toward the light source installation surface 22 as illustrated in FIG. 15 or may have a shape having steps (level differences) obtained by discontinuously reducing the diameter in a plurality of diameter reduction locations as illustrated in FIG. 16.

In addition, the shape of each unit pattern 32 is not limited to the approximately conical shape and may be a triangular pyramid or a quadrangular pyramid shape, or a cylinder or a prism shape having a polygonal shape in a plan view, or may be indefinite.

A material of the unit pattern 32 is a material having a high light reflectivity (hereinafter, referred to as a reflective material). Examples of the reflective material include a white pigment. Examples of the white pigment include titanium oxide, barium sulfate, potassium carbonate, silica, talc, and clay. Examples of the reflective material other than the white pigment include conductive silver ink including a silver complex as a main component (for example, conductive silver ink including coated ultrafine silver particles as a main component). In addition, a thermoplastic resin composition including the white pigment can be used as the reflective material. As a specific example of a thermosetting resin composition used as the reflective material, two-component type thermosetting resin including a main agent and a curing agent, such as a well-known combination of urethane resin and an isocyanate compound, a combination of epoxy resin and polyamine or acid anhydride, or a combination of silicone resin and a crosslinking agent, and three-component type thermosetting resin containing an curing accelerator such as amine, imidazole, and a phosphorus base can be used. Specifically, the light reflecting layer using silicone-based thermosetting resin disclosed in JP2014-129549A can be illustrated.

In the present embodiment, it is assumed that the unit pattern 32 is formed using titanium oxide as the reflective material.

The forming (patterning) of the reflection pattern 30 on the first surface 26 may be performed by printing using an ink jet method or printing using other methods (for example, screen printing). However, a method of pattern forming (patterning) is not limited to printing and may be metal vapor deposition or coating with the reflective material. In addition, the reflection pattern 30 may be formed by coating the entire surface of the first surface 26 with the reflective material and then, scraping off the reflective material to leave the unit pattern 32.

In the present embodiment, the reflection pattern 30 is formed on the first surface 26 based on the light distribution characteristics of the micro light source 16 (specifically, the mini LED which is the micro light emitting element 18) installed on the light source installation surface 22.

Specifically, each of the plurality of unit patterns 32 forming the reflection pattern 30 is formed on the first surface 26 such that the index value (for example, the normalized dynamic range and the normalized sigma) related to the distribution of brightness on the second surface 28 satisfies a set condition. Here, the set condition is a numerical range that is to be satisfied by the index value such as the normalized dynamic range and the normalized sigma as a requirement of the light source unit 14.

More specifically, the thickness, a size, and an arrangement position of the unit pattern 32 are decided such that light is reduced to a target value in a region of the emission surface positioned immediately above the micro light emitting element 18. In addition, the thickness, the size, and the arrangement position of the unit pattern 32 are decided such that each of diffused light and reflected light is reduced in a region positioned near immediately above the micro light emitting element 18.

Here, the thickness of the unit pattern 32 is a length from a bottom surface (an end on the +Z side) to a top portion (an end on the −Z side) of the unit pattern 32. The size of the unit pattern 32 is the maximum diameter of the unit pattern 32. In addition, the arrangement position of the unit pattern 32 is a center position of the unit pattern 32 (a center position of the bottom surface of the unit pattern 32 forming a circular shape) in the X and Y directions.

The brightness distribution on the emission surface (that is, the second surface 28) and the index value such as the normalized dynamic range and the normalized sigma are affected by the low reflection pattern 38 and change in accordance with a size of the low reflection pattern 38. Thus, in the present embodiment, the thickness, the size, and the arrangement position of each unit pattern 32 are decided in accordance with the size of the low reflection pattern 38 arranged at a position immediately below the unit pattern 32.

The reflection pattern 30 is formed on the first surface 26 such that each unit pattern 32 has the decided thickness, size, and arrangement position. A procedure of forming the reflection pattern 30 will be described in detail in a later section.

(Low Reflection Pattern)

The low reflection pattern 38 is formed in the region of the light source installation surface 22 positioned around the micro light source 16 (that is, the micro light emitting element 18) and has a lower reflectivity than a region (non-pattern forming region) other than the region. The low reflection pattern 38 is provided to laminate the substrate 20 with the low reflection pattern 38 on the +Z side of the substrate 20.

Figure 17:
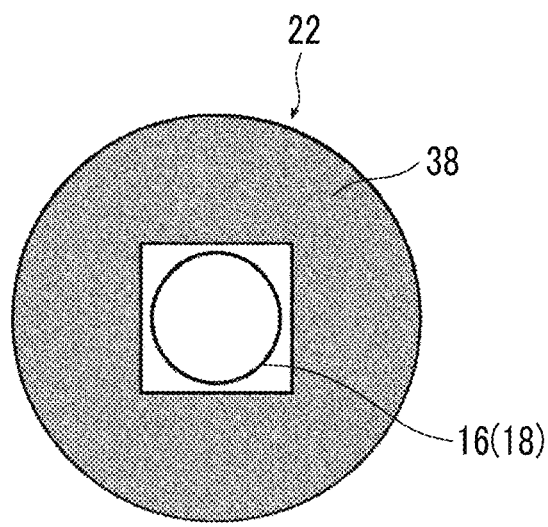
FIG. 17 is a plan view of the low reflection pattern.

In the present embodiment, the low reflection pattern 38 is formed around each micro light emitting element 18 and, for example, consists of a circular pattern as illustrated in FIG. 17. A shape of the low reflection pattern 38 is not limited to a circular shape and may be, for example, a rectangular shape, a triangular shape, or other polygonal shapes, or may be indefinite.

As illustrated in FIG. 17, in a center part of the circular pattern, a rectangular hole is formed in order to insert a socket portion (not illustrated) of the mini LED forming the micro light emitting element 18 into the substrate 20. In addition, a center of the circular pattern is at an identical position or an approximately identical position to a center of the micro light emitting element 18 in the X and Y directions.

A material of the low reflection pattern 38 is a material having a low light reflectivity. Examples of the material of the low reflection pattern 38 include metal subjected to blackening processing, specifically, a material of any of blackened Ni, blackened Cu, blackened Al, blackened Zn, blackened Cr, and the like, or a material of a combination thereof. Besides, tungsten silicide, cupric oxide, aluminum oxide, triiron tetroxide, and the like may be used as the material of the low reflection pattern 38.

A forming method (patterning method) of the low reflection pattern 38 on the light source installation surface 22 is not particularly limited. For example, printing using the ink jet method, screen printing, printing using other methods, metal vapor deposition, or coating with the reflective material can be used. In addition, the low reflection pattern 38 may be formed by coating the entire surface of the light source installation surface 22 with a low reflectivity material and then, scraping off the low reflectivity material to leave only an area around the micro light emitting element 18.

In addition, the low reflection pattern 38 is formed based on the light distribution characteristics of the micro light source 16 (specifically, the micro light emitting element 18). Specifically, the size (specifically, a radius) of the low reflection pattern 38 is decided based on an evaluation value related to the distribution of brightness on the predetermined surface. Here, as described above, the predetermined surface is a plane that is present at a position closer to the first surface 26 than to the light source installation surface 22 between the light source installation surface 22 and the first surface 26. In addition, the evaluation value related to the distribution of brightness on the predetermined surface is a value $E(x)$ described later.

The low reflection pattern 38 is formed to have the decided size (outer diameter) on the light source installation surface 22 for each micro light emitting element 18. A procedure of forming the low reflection pattern 38 will be described in detail in a later section.

(Second Light Scattering Body)

The second light scattering body 36 diffuses the light from the micro light source 16 by scattering the light inside the second light scattering body 36. In the present embodiment, the second light scattering body 36 has a flat plate or thin film shape and is arranged in parallel with the first light scattering body 34 between the first light scattering body 34 and at least one micro light source 16 (that is, the plurality of micro light emitting elements 18) in the Z direction as illustrated in FIG. 3.

The light emitted from each micro light emitting element 18 is incident on the second light scattering body 36, scatters inside the second light scattering body 36, and is eventually transmitted through the second light scattering body 36. Accordingly, the evenness in brightness on the second surface 28 which is the emission surface can be efficiently secured. In addition, providing the second light scattering body 36 can increase robustness to misregistration of the first light scattering body 34.

A reflection pattern corresponding to the reflection pattern 30 of the first light scattering body 34 is not formed in the second light scattering body 36. Specifically, the second light scattering body 36 consists of a laminate including a base layer and a scattering layer. The base layer is composed of a plate material or a film material having a light-transmitting property. For example, an optical film in which a light diffusion structure (for example, a random micro lens array) is formed on a semi-transparent resin film consisting of polycarbonate or acrylic resin can be used as the base layer. The scattering layer is not scattered unlike the reflection pattern 30 and is formed to have an approximately even thickness on the entire surface (for example, a surface positioned on a first light scattering body 34 side) of the base layer. A material constituting the scattering layer is the same reflective material as the reflection pattern 30. For example, titanium oxide, barium sulfate, potassium carbonate, silica, talc, and clay can be used.

The second light scattering body 36 is not limited to the laminate. For example, a light guide member configured by dispersing, inside a base formed of transparent resin, light scattering particles having a different refractive index from the base may be used as the second light scattering body 36.

As the second light scattering body 36 approaches the light source installation surface 22, spreading of the light from the micro light source 16 toward the second light scattering body 36 is increased. In addition, as a distance between the first light scattering body 34 and the second light scattering body 36 is increased, the spreading (degree of diffusion) of the light from the second light scattering body 36 is increased. Considering such a tendency, it is desirable that the second light scattering body 36 is arranged at a position at which an effect of the spreading of the light can be exhibited to the maximum.

While a configuration example of the light source unit 14 of the present embodiment is described so far, the above configuration is merely an example, and other configurations are also considered.

In the present embodiment, while the second surface 28 which is the surface of the base 24 on the +Z side is the emission surface, the present invention is not limited thereto. For example, a prism sheet may be overlaid on the second surface 28, and a surface of the prism sheet on the +Z side may be used as the emission surface.

In addition, in the present embodiment, while the second light scattering body 36 is provided, a configuration in which the second light scattering body 36 is not provided may also be used.

In addition, while the light source unit 14 according to the present embodiment is used as the backlight unit of the display device 10, the present invention is not limited thereto. The light source unit 14 may be used as an illumination device of surface emitting light.

[Light Source Unit Manufacturing Apparatus]

Figure 18:
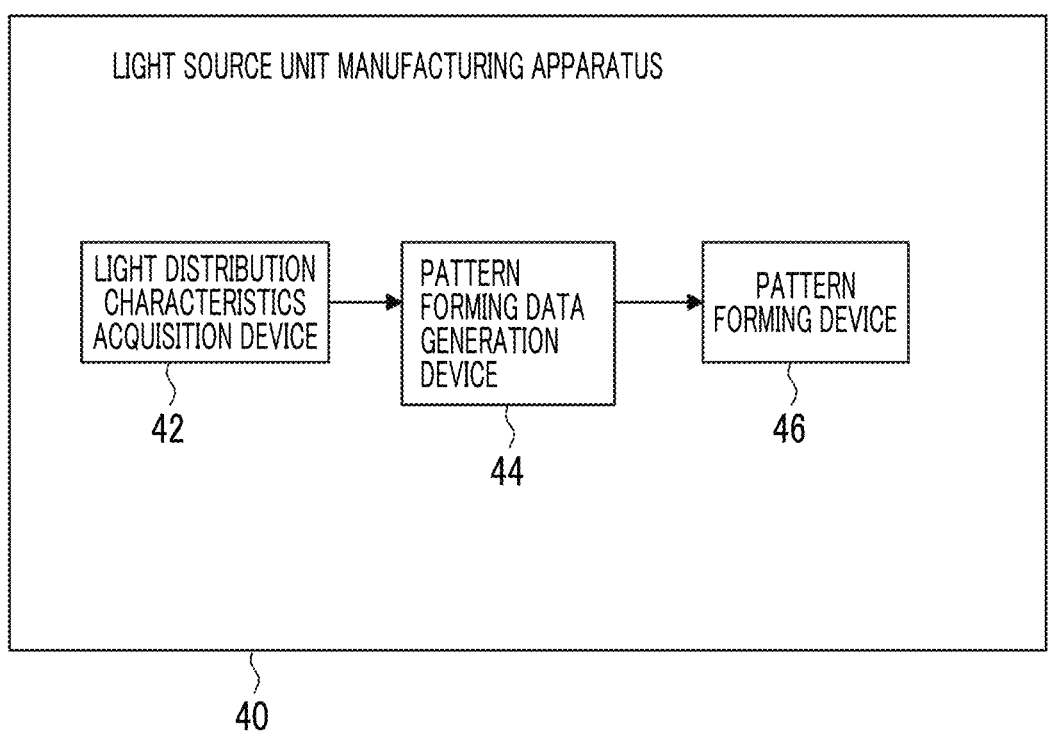
FIG. 18 is a descriptive diagram for a light source unit manufacturing apparatus according to an embodiment of the present invention.

Next, a light source unit manufacturing apparatus 40 for manufacturing the light source unit 14 of the present embodiment will be described. As illustrated in FIG. 18, the light source unit manufacturing apparatus 40 includes a light distribution characteristics acquisition device 42, a pattern forming data generation device 44, and a pattern forming device 46.

(Light Distribution Characteristics Acquisition Device)

The light distribution characteristics acquisition device 42 is a device that acquires the light distribution characteristics (in a strict sense, information related to the light distribution characteristics) of the micro light source 16 used in the light source unit 14, and is composed of, for example, a well-known light distribution characteristics measuring device. A device that rotates a light source by a goniometer, a rotating stage, or a rotating mirror and measures illuminance (luminosity) within an angle of the rotation by an illuminance meter or a brightness meter can be used as the light distribution characteristics measuring device. Examples of the light distribution characteristics measuring device include the LED illumination light distribution measuring system NeoLight manufactured by Systems Engineering Inc. and the brightness light distribution characteristics measuring device C9920-11 manufactured by Hamamatsu Photonics K.K.

In addition, an LED light distribution measuring device (for example, the measuring device of OptCom Co., Ltd) that measures light distribution spectral distribution characteristics of an LED element or an LED module under a condition set in advance can be used as other light distribution characteristics measuring devices. In this device, an LED radiation angle is adjusted by controlling a vertical light distribution stage and a horizontal light distribution stage, and positioning is performed to face a photodetector. Then, a lighting power supply of the device is controlled to light in accordance with a measuring condition, and a spectral distribution is measured by a measuring control device.

(Pattern Forming Data Generation Device)

The pattern forming data generation device 44 is a device that generates data (hereinafter, referred to as pattern forming data) for forming each of the reflection pattern 30 and the low reflection pattern 38, and is composed of, for example, a computer comprising a processor, not illustrated. For example, the processor is composed of a central processing unit (CPU) or a micro-processing unit (MPU) and executes a program for optical simulation stored in a storage device (not illustrated) inside the device. Through the execution of the simulation program, the pattern forming data generation device 44 decides a forming condition of each of the reflection pattern 30 and the low reflection pattern 38 based on the light distribution characteristics of the micro light source 16. Then, the pattern forming data generation device 44 generates the pattern forming data indicating the decided forming condition of each pattern.

A device that generates data indicating the forming condition of the reflection pattern 30 and a device that generates data indicating the forming condition of the low reflection pattern 38 may be individually separated or may be the identical device.

In generating the pattern forming data, the pattern forming data generation device 44 first acquires the information related to the light distribution characteristics of the micro light source 16 (for example, a measurement value of the light distribution characteristics) from the light distribution characteristics acquisition device 42.

Figure 19:
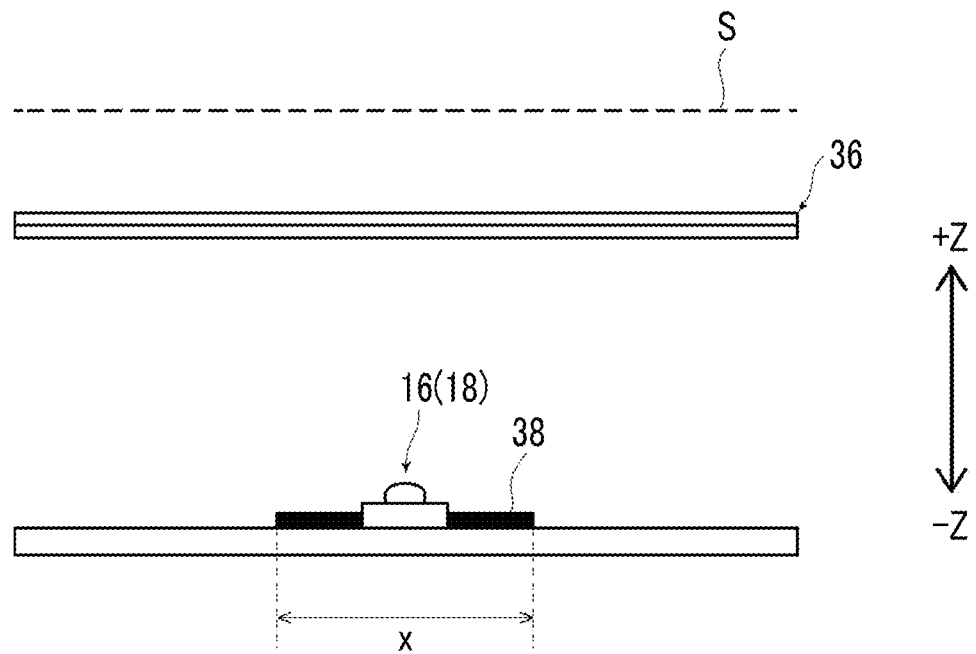
FIG. 19 is a descriptive diagram for a model for deciding a forming condition of the low reflection pattern.

Next, the pattern forming data generation device 44 decides the size of the low reflection pattern 38 (specifically, the radius of the pattern) based on the acquired light distribution characteristics. At this point, the size of the low reflection pattern 38 is decided based on the evaluation value related to the distribution of brightness in an imaginary plane S inside the model illustrated in FIG. 19. In the model, as illustrated in FIG. 19, one micro light emitting element 18 as the micro light source 16 is installed on the light source installation surface 22 of the substrate 20. In addition, as illustrated in FIG. 19, the low reflection pattern 38 is formed in the region of the light source installation surface 22 positioned around the micro light emitting element 18.

In addition, in the model, the second light scattering body 36 is arranged at a position immediately above the light source installation surface 22. The second light scattering body 36 in the model consists of a laminate of two layers including the base layer and the scattering layer. In the second light scattering body 36 of the model illustrated in FIG. 19, a thickness of the base layer is 0.1 mm, and a thickness of the scattering layer is 0.08 mm. The base layer is laminated with the scattering layer on the +Z side.

In addition, in the model, the imaginary plane S is set above (on the +Z side) the second light scattering body 36. The imaginary plane S corresponds to a plane that is present at a position closer to the first surface 26 than to the light source installation surface 22 in the Z direction. In the model illustrated in FIG. 19, an interval between the imaginary plane S and the surface of the second light scattering body 36 on the +Z side is set to a size corresponding to a target interval, specifically, set to 4 mm.

Figure 20:
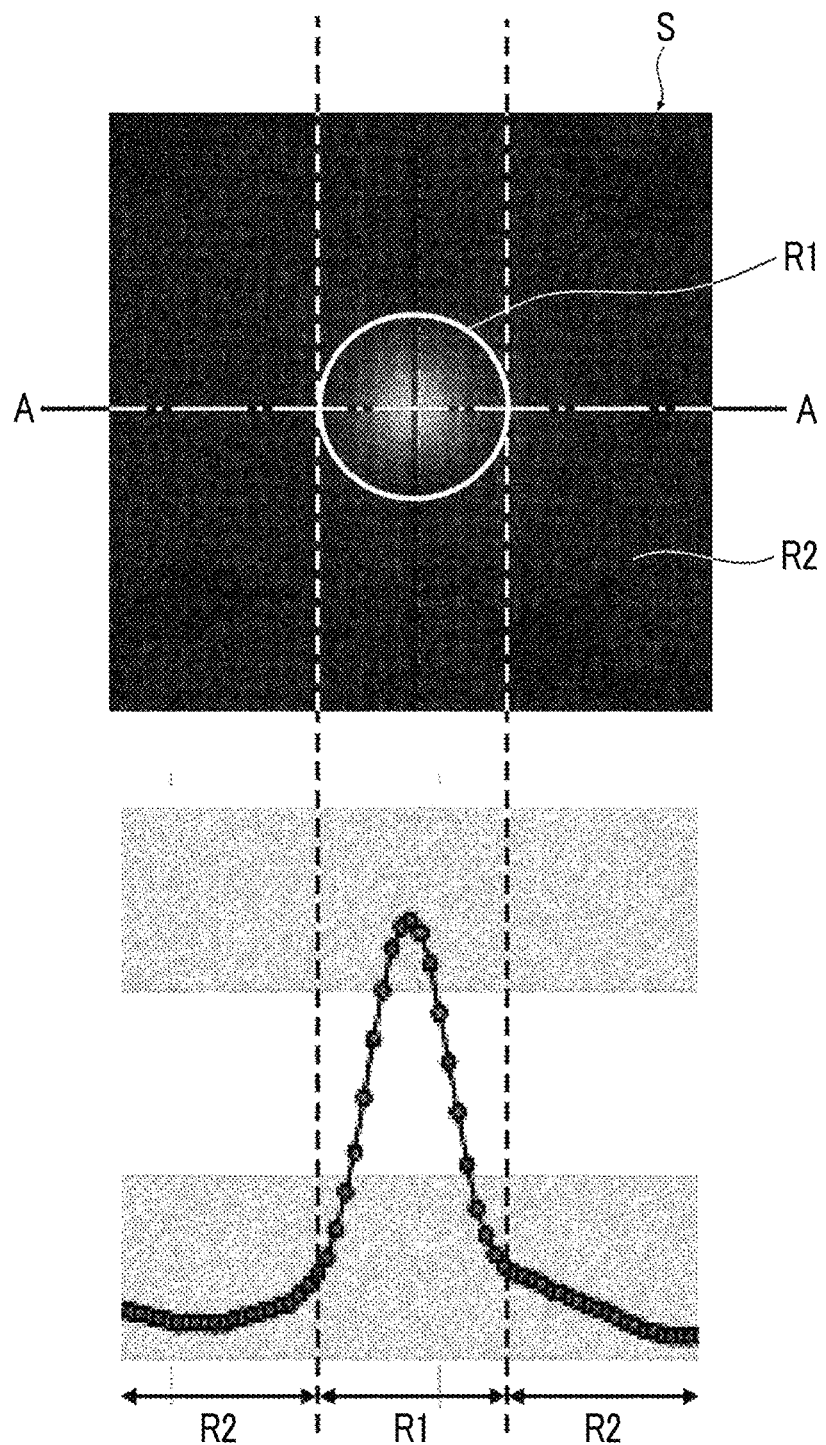
FIG. 20 is a diagram illustrating an intensity distribution of light on the predetermined surface that is referred to in the decision of the forming condition of the low reflection pattern.

The pattern forming data generation device 44 estimates the distribution of brightness in the imaginary plane S by the optical simulation using the acquired light distribution characteristics. Accordingly, a simulation result as illustrated in FIG. 20 is obtained. In FIG. 20, an upper diagram illustrates a two-dimensional distribution of brightness in the imaginary plane S, and a lower diagram illustrates a one-dimensional distribution of brightness within a range corresponding to A-A line in FIG. 20.

As is perceived from FIG. 20, in the simulated distribution of brightness, a steep distribution in which the brightness steeply changes is illustrated in a near region R1. On the other hand, in a non-near region R2, a change in brightness is gentle, and the brightness is decreased in a direction of separating from the near region R1.

In addition, the pattern forming data generation device 44 calculates the evaluation value from the simulation result of the brightness distribution. At this point, the pattern forming data generation device 44 calculates the evaluation value for each size while changing the size of the low reflection pattern 38.

The pattern forming data generation device 44 specifies the size of the low reflection pattern 38 when the evaluation value satisfies a predetermined condition. Here, the predetermined condition is that the evaluation value is a value when the brightness distribution is a target distribution. The target distribution is a distribution of which peak intensity is lower and smoother (broader).

The size specified using the above procedure is employed as the size of the low reflection pattern 38 actually formed on the light source installation surface 22.

In a case where a procedure of deciding the size of the low reflection pattern 38 is described in detail, the imaginary plane S is divided into the near region R1 and the non-near region R2 in the simulation of the distribution of brightness in the imaginary plane S while changing the size of the low reflection pattern 38. The near region R1 is a region positioned immediately above the micro light emitting element 18 and is, for example, a circular region centered at the same position as the center of the micro light emitting element 18 in the X and Y directions. The non-near region R2 is a region other than the near region R1 and is positioned around the near region R1.

In the present embodiment, a size of the near region R1 (in other words, a diameter of a boundary between the near region R1 and the non-near region R2) is a size obtained by adding a set length a to an outer diameter of the micro light emitting element 18. The set length a is obtained by multiplying the outer diameter of the micro light emitting element 18 by a predetermined coefficient $\beta$. The coefficient $\beta$ is decided in accordance with the light distribution characteristics of the micro light emitting element 18 within a range of 0.05 to 2.0.

In the simulation of the distribution of brightness in the imaginary plane S, first, the brightness distribution in a case where the low reflection pattern 38 is not formed (that is, in a case where a radius x of the low reflection pattern 38 is 0) is simulated. Peak brightness (the maximal value of brightness) in the near region R1 at this point is denoted by n0, and average brightness in the non-near region R2 is denoted by a0.

Next, the brightness distribution in a case where the low reflection pattern 38 is formed (that is, the radius x is greater than 0) is simulated. The peak brightness in the near region R1 at this point is denoted by nx, and the average brightness in the non-near region R2 is denoted by ax.

The evaluation value E(x) that takes the radius x as a variable is calculated as the evaluation value related to the distribution of brightness in the imaginary plane S using n0, a0, nx, and ax. A calculation expression of the evaluation value E(x) is as follows.

$$E(x)=k1\times(nx-n0)+k2\times(a0-ax)$$

k1, k2: weight coefficient

The evaluation value E(x) is calculated using the expression while the radius x is changed, and the radius x with which a calculation result is the maximum is specified. The specified radius x is decided as the size (radius) of the low reflection pattern 38.

Next, the pattern forming data generation device 44 decides the thickness, the size, and the arrangement position (hereinafter, the thickness and the like) of each unit pattern 32 based on the light distribution characteristics acquired by the light distribution characteristics acquisition device 42 and the decided size of the low reflection pattern 38. At this point, the thickness and the like are decided to satisfy a first condition and a second condition below.

First condition: brightness is less than or equal to a reference value in each of a specific region present at a position overlapping with at least one micro light source 16 and a peripheral region surrounding the specific region on the second surface 28.

Second condition: the degree of dispersion of brightness on the second surface 28 is within a target range.

The first condition and the second condition are included in the set condition.

The "specific region" in the first condition is a region that is present at a position overlapping with each micro light emitting element 18 in the Z direction on the second surface 28 and, more specifically, is a region positioned immediately above each micro light emitting element 18. Assuming a case where the plurality of unit patterns 32 are not formed on the first surface 26, the brightness in the specific region is the highest.

The "peripheral region" in the first condition is a region arranged to surround the specific region on the second surface 28 and is present in a layer shape from a side adjacent to the specific region toward an outside.

The "reference value" in the first condition is a target value set with respect to the brightness in the specific region and is, for example, a value (average brightness) obtained by averaging the brightness in each region of the second surface 28 in a case where the plurality of unit patterns 32 are not formed on the first surface 26.

The "degree of dispersion of brightness" in the second condition is an evaluation indicator related to the distribution of brightness in each region (that is, each of the specific region and the peripheral region) of the second surface 28 and, in other words, illustrates smoothness of brightness.

The "target range" in the second condition is a numerical range set with respect to the degree of dispersion of brightness and is, for example, a range (error range) that is identical or can be considered identical to the target value of the degree of dispersion. In the present embodiment, the target range is set based on the reference value of the first condition.

The pattern forming data generation device 44 executes predetermined operation processing in deciding the thickness and the like of each unit pattern 32 to satisfy the first condition and the second condition. This operation processing flow transitions in accordance with the procedure illustrated in FIG. 21. Hereinafter, the operation processing flow will be described with reference to FIG. 21.

(Operation Processing Flow)

In the execution of the operation processing flow, the second surface 28 is compartmented into a plurality of calculation units. Specifically, the second surface 28 is divided into a plurality of regions centered at the arrangement position of each micro light emitting element 18 in the X and Y directions, and each region is set as the calculation unit. Here, the same number of calculation units as the micro light emitting elements 18 are present on the second surface 28. In the present embodiment, the calculation units are rectangular regions as illustrated in FIGS. 22A and 22B.

Figure 22A:
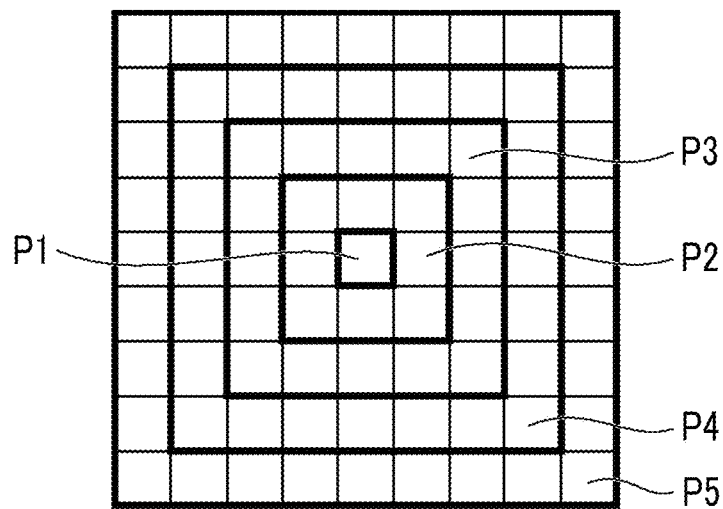
FIG. 22A is a descriptive diagram of a calculation region (Part 1).
Figure 22B:
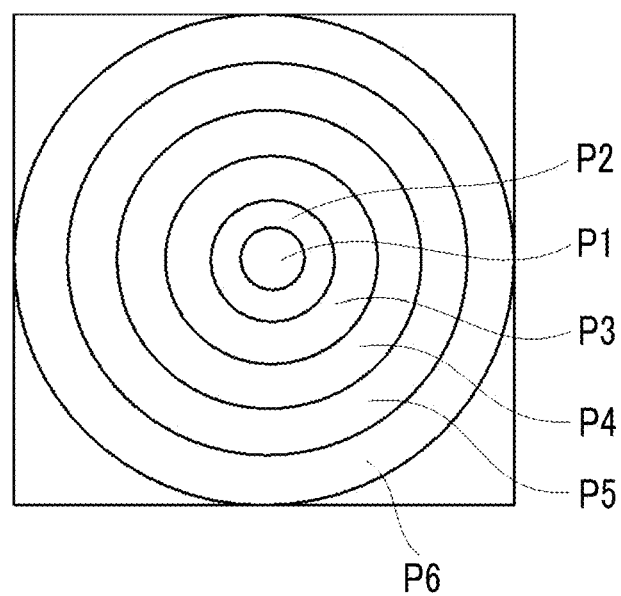
FIG. 22B is a descriptive diagram of the calculation region (Part 2).

Each calculation unit is further divided into small calculation regions as illustrated in FIGS. 22A and 22B. Here, the calculation region may be arranged in a lattice in the X and Y direction as illustrated in FIG. 22A or may be concentrically arranged as illustrated in FIG. 22B.

In each calculation unit, a calculation region P1 that is present at the same position as the arrangement position of each micro light emitting element 18 in the X and Y directions corresponds to the specific region. Calculation regions P2 to P6 that are arranged to form a rectangular frame or a ring surrounding the specific region on the outside of the specific region correspond to the peripheral region.

A size (mesh size) and a compartment method of the calculation region are not particularly limited. Hereinafter, a case where each calculation unit is divided into calculation regions of multiple layers centered at the arrangement position of the micro light emitting element 18 will be illustratively described. For example, in a case of using the calculation unit illustrated in FIG. 22A, 9×9 calculation regions arranged in a matrix in the X and Y directions are handled. On the other hand, in a case of using the calculation unit illustrated in FIG. 22B, six concentrically arranged calculation regions are handled.

Figure 21:
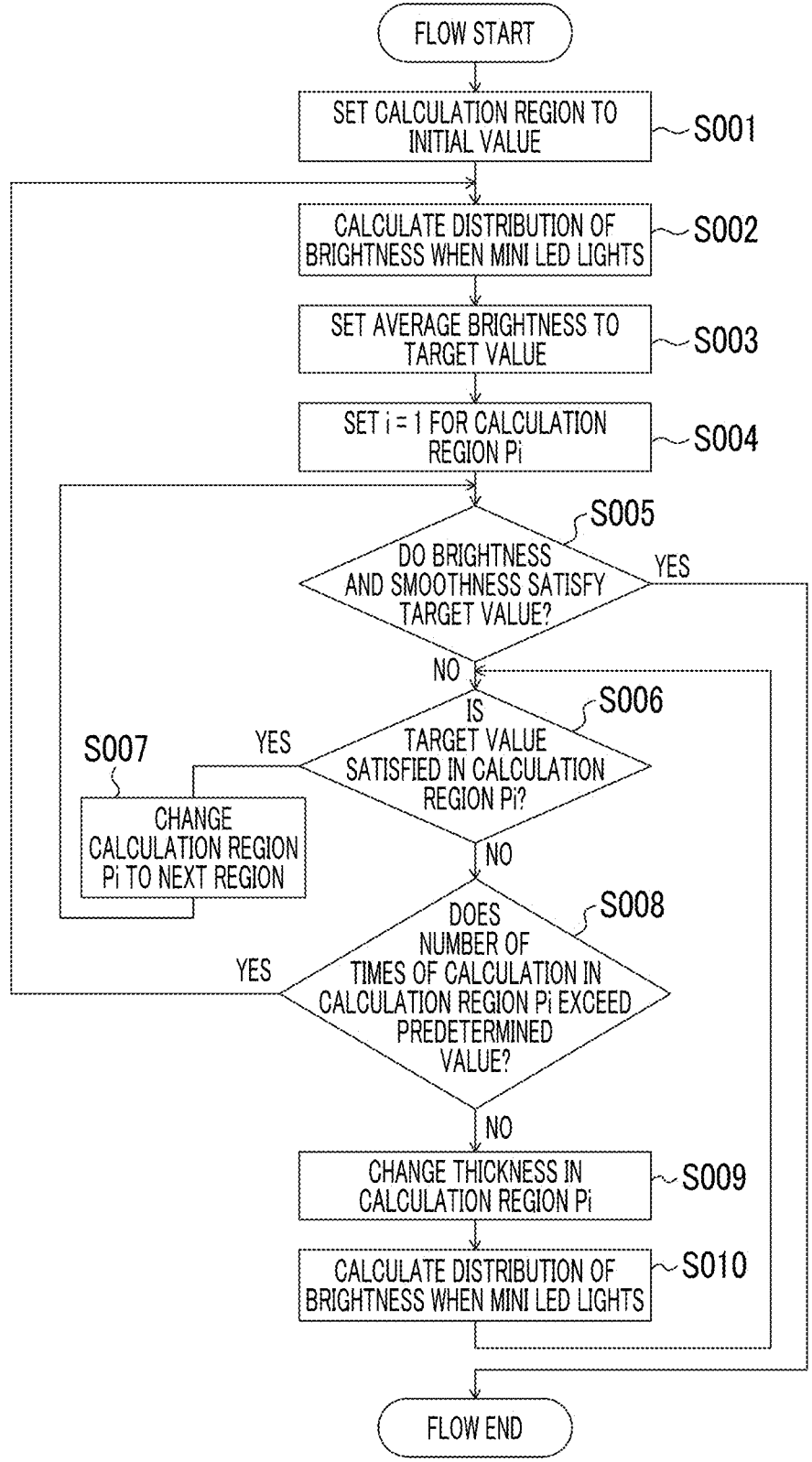
FIG. 21 is a diagram illustrating an operation processing flow for deciding a forming condition of the reflection pattern.

Each step in the operation processing flow is executed on one calculation unit as a target. In the operation processing flow, as illustrated in FIG. 21, first, all calculation regions in the calculation unit are set to an initial value (S001). In order to obtain the initial value, a case where the plurality of unit patterns 32 are not formed on the first surface 26 is assumed, and the distribution of brightness in each region of the second surface 28 in this case is obtained. The smoothness as the degree of dispersion of brightness is evaluated from the obtained brightness distribution, and a thickness with which the evaluation value is the minimum is set as the initial value.

Next, in a state where each calculation region is set to the initial value, the distribution of brightness in the calculation unit in a case where the micro light emitting element 18 lights is calculated, and the smoothness is evaluated (S002). Specifically, the distribution of brightness is obtained by performing the optical simulation using the light distribution characteristics acquired by the light distribution characteristics acquisition device 42 and the previously decided size of the low reflection pattern 38, and the smoothness is evaluated from the brightness distribution. The average value of the distribution of brightness calculated in step S002 is set as the target value (that is, the reference value of the first condition) (S003).

Subsequent steps are repeated for each calculation region. Thus, the calculation region as a calculation target is denoted by Pi, and i=1 is set (S004). Here, i is decided based on the arrangement position of the micro light emitting element 18 in the X and Y directions. As i is decreased, this means approaching the micro light emitting element 18. The calculation region in a case of i=1, that is, P1, is the specific region positioned immediately above the micro light emitting element 18.

In next step S005, whether or not the brightness of the distribution calculated in step S002 is within the error range set in advance with respect to the target value (average brightness) set in step S003 is determined. In addition, in step S005, whether or not the smoothness evaluated in step S002 is within the set range decided based on the target value, specifically, satisfies the target value within the error range of the target value, is determined.

In a case where a determination result in step S005 is "Yes", the brightness of the distribution satisfies the target value, and the smoothness is within the set range. Thus, the operation processing flow is finished.

On the other hand, in a case where the determination result in step S005 is "No", whether or not the brightness in the calculation region Pi accomplishes the target value is determined (S006). In step S006 that is initially performed, whether or not the brightness in the specific region accomplishes the target value is determined because of i=1.

In a case where a determination result in step S006 is "Yes", that is, in a case where the brightness in the calculation region Pi satisfies the target value, i is incremented, and the calculation region Pi as the calculation target is changed to the next region (S007). Then, a return is made to step S005.

On the other hand, in a case where the determination result in step S006 is "No", that is, in a case where the brightness in the calculation region Pi does not satisfy the target value, a separate determination is performed in step S008 described later. In a case where a determination result in step S008 is "No", a thickness in the calculation region Pi (that is, the thickness of the unit pattern 32 on the calculation region Pi) is changed (S009).

In step S009, in a case where the brightness in the calculation region Pi significantly exceeds the target value, the thickness is changed to decrease the brightness. On the other hand, in a case where the brightness in the calculation region Pi is significantly less than the target value, the thickness is changed to increase the brightness.

In the changing of the thickness, a relationship (correlation) between an amount of change of the thickness and an amount of change of the brightness may be specified in advance, and the specified correlative relationship may be stored as table data. In step S009, it is preferable to obtain the amount of change of the thickness with which appropriate brightness is obtained with reference to the table data, and change the thickness by the obtained amount of change.

In addition, in step S009, the thickness is changed such that the thickness after change does not exceed an adjustment range of the thickness decided in advance. In a case where the thickness after change reaches an upper limit value or a lower limit value of the adjustment range, the number of times of calculation with respect to the calculation region Pi is changed to a predetermined value (specifically, an upper limit number of times). In this case, the determination result in step S008 described later results in "Yes", and a return is made to step S002 to evaluate the smoothness by calculating the distribution of brightness. Then, next step S003 is executed to set the target value.

Specifically, in the calculation region Pi in which the thickness reaches the upper limit, the brightness cannot be decreased anymore. Thus, the target value needs to be decreased. Here, the brightness in the calculation region Pi is calculated in a descending order. Thus, the above situation only occurs with i=1, that is, in the specific region. Based on this point, the thickness is increased above the initial value, and the average value is calculated again in a state where the brightness in the specific region is decreased. Accordingly, the average brightness, that is, the target value, is decreased below the previous value. Consequently, a possibility of satisfying the target value while maintaining the thickness of the pattern at a small value is increased.

On the other hand, the calculation region Pi in which the thickness reaches the lower limit is in a state where the brightness is decreased below the target value. In this case, light needs to be guided to the calculation region Pi by decreasing (scattering) the brightness in a region closer to the specific region. In the calculation region P[i−1] or the like that is present ahead of the calculation region Pi, the brightness satisfies the target value. Thus, in a case where the average value is calculated, the average value is decreased below the previous target value (average brightness). Based on this point, in the calculation region P[i−1] or the like present ahead, the target value is set to obtain a thickness with which the light is further deeply scattered. Consequently, in the calculation region Pi, a possibility of satisfying the target value while the thickness of the pattern has a large value is increased.

Returning to the flow in FIG. 21, after the thickness in the calculation region Pi is changed in step S009, the distribute of brightness in the calculation unit in a case where the micro light emitting element 18 lights is calculated by applying the thickness after change (S010). Even at this point, the distribution of brightness is calculated by performing the optical simulation using the light distribution characteristics acquired by the light distribution characteristics acquisition device 42 and the decided size of the low reflection pattern 38.

In addition, at this point in time, the number of times of calculation for the calculation region Pi is increased by +1 (counted up).

Then, a return is made to step S006 to determine whether or not the brightness in the calculation region Pi accomplishes the target value. In a case where the determination result is "Yes", step S007 is executed, and then, a return is made to step S005. On the other hand, in a case where the determination result in step S006 is "No", step S008 is executed to determine whether or not the number of times of calculation for the calculation region Pi exceeds the predetermined value (upper limit number of times). In a case where the determination result in step S008 is "No", step S009 is executed to change the thickness in the calculation region Pi.

On the other hand, in a case where the determination result in step S008 is "Yes", a return is made to step S002 in order to correct the target value. That is, step S002 is executed to calculate the distribution of brightness in the calculation unit in a case where the micro light emitting element 18 lights, based on the thickness set at this point in time in each calculation region. Then, step S003 is executed to set the average value of brightness in the distribution calculated in step S002 to a new target value.

The operation processing flow is executed in the above procedure, and step S002 to step S010 are repeated (looped) while the calculation region Pi as the calculation target is changed, until the determination result in step S005 results in "Yes". Accordingly, as illustrated in FIGS. 23A and 23B, the thickness of the unit pattern 32 in each calculation region Pi is decided.

Figure 23A:
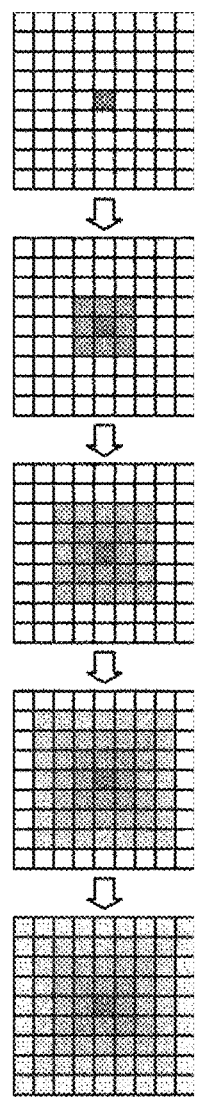
FIG. 23A is a diagram illustrating a state where a region as a calculation target transitions (Part 1).
Figure 23B:
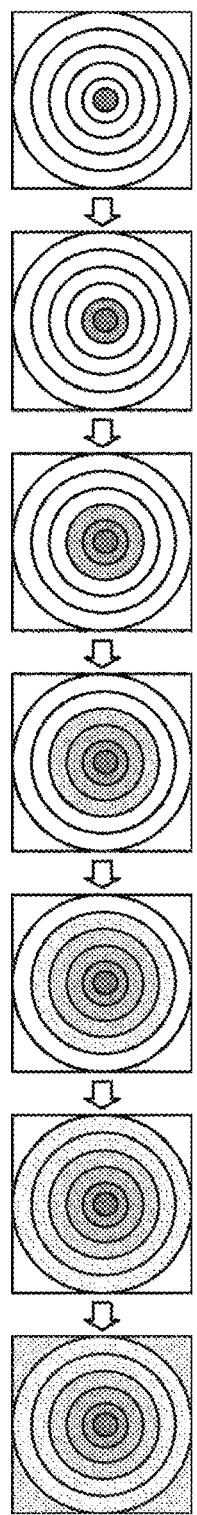
FIG. 23B is a diagram illustrating a state where the region as the calculation target transitions (Part 2).

In each of FIGS. 23A and 23B, a state where the thickness in each calculation region is sequentially decided from the top to the bottom is represented. A calculation region (a part newly colored in each of FIGS. 23A and 23B) in which the thickness is newly calculated moves from an inside to an outside.

As a processing algorithm, the flow needs to be appropriately stopped even under a situation in which a solution originally does not exist. Thus, the number of times the entire loop is performed is separately counted, and the flow is stopped with "no solution" in a case where the number of times the loop is performed exceeds an upper limit number of times.

The thickness (that is, the thickness of the unit pattern 32) in each calculation region Pi is decided at a point in time when the determination result in step S005 results in "Yes". Accordingly, the thickness and the like that satisfy the first condition and the second condition are decided for each unit pattern 32. In addition, the decided thickness and the like reflect the previously decided size (outer diameter) of the low reflection pattern 38 and are decided to be a thickness and the like corresponding to the size.

(Pattern Forming Device)

The pattern forming device 46 forms the reflection pattern 30 on the first surface 26 of the base 24 and forms the low reflection pattern 38 in the region of the light source installation surface 22 positioned around the micro light source 16 in accordance with the pattern forming data generated by the pattern forming data generation device 44.

The pattern forming device 46 of the present embodiment is composed of an ink jet type printer and forms the plurality of unit patterns 32 by ejecting ink containing the reflective material toward each part of the first surface 26. At this point, the pattern forming device 46 adjusts an ejection timing, an ejection amount, and the like of the ink such that the thickness and the like of each unit pattern 32 result in a thickness and the like defined in the pattern forming data.

That is, the pattern forming data of the present embodiment is data (printing data) for printer control. A predetermined amount of the ink lands at a predetermined position of the first surface 26 by ejecting the ink in accordance with the pattern forming data by the pattern forming device 46 which is a printer. Consequently, the plurality of unit patterns 32 are formed on the first surface 26 with the thickness and the like satisfying the first condition and the second condition.

In addition, the pattern forming device 46 forms the low reflection pattern 38 by ejecting ink containing the low reflectivity material toward the region of the light source installation surface 22 of the substrate 20 positioned around the micro light emitting element 18 which is the micro light source 16. At this point, the pattern forming device 46 adjusts an ejection amount and the like of the ink such that the size (radius) of the low reflection pattern 38 results in a size defined in the pattern forming data. That is, the low reflection pattern 38 having the decided size is formed in the region of the light source installation surface 22 positioned around the micro light emitting element 18 by causing a predetermined amount of the ink to land in the region by ejecting the ink in accordance with the pattern forming data by the pattern forming device 46.

As described above, the base 24 (that is, the first light scattering body 34) in which the reflection pattern 30 is formed, and the substrate 20 in which the low reflection pattern 38 is formed are manufactured by the pattern forming device 10. The light source unit 14 is manufactured by combining the first light scattering body 34, the substrate 20 in which the micro light emitting element 18 is installed, and the second light scattering body 36.

The pattern forming device 46 is not limited to the ink jet type printer and may be composed of other devices, for example, a printer of a printing type other than the ink jet type or an ink coating device. Alternatively, by using screen printing technology, a device that creates a plate for forming each of the reflection pattern 30 and the low reflection pattern 38 and performs printing using the plate may be used.

In addition, a device that forms the reflection pattern 30 and a device that forms the low reflection pattern 38 may be individually separated or may be the identical device.

EXAMPLES

Hereinafter, the present invention will be described in further detail based on the following examples.

Materials, used amounts, ratios, processing contents, processing procedures, and the like illustrated in the examples can be appropriately changed without departing from the gist of the present invention. Accordingly, the scope of the present invention is not to be construed as being limited to the examples.

[Optical Simulation Related to Brightness Distribution]

In Examples 1 to 4 and Comparative Examples 1 to 4, the distribution of brightness on a target surface is calculated by the optical simulation. Here, it is assumed that the brightness in each part of the target surface changes and is evaluated as a relative value obtained by dividing the brightness by an average value thereof.

Figure 24:
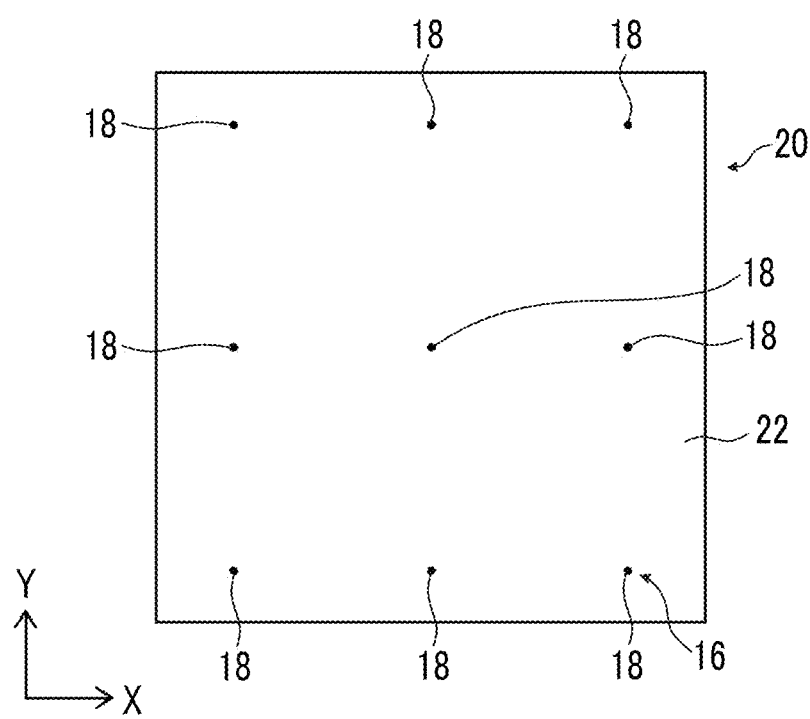
FIG. 24 is a descriptive diagram of a simulation model.

In the model (hereinafter, a simulation model) used in the optical simulation, the substrate 20 having a square shape in a plan view is used. In addition, the mini LED which is the micro light emitting element 18 is arranged at each of a plurality of arrangement positions illustrated in FIG. 24 on the light source installation surface 22. Specifically, total nine mini LEDs are arranged at an approximately constant pitch in each direction of the X and Y directions from the center position of the light source installation surface 22. The pitch of the mini LEDs in the X direction is 5.386 mm, and the pitch of the mini LEDs in the Y direction is 6.066 mm.

The chip size of each mini LED is 230 µm×120 µm×130 µm. The light distribution characteristics illustrated in FIG. 1 are used as the light distribution characteristics of each mini LED. The viewing angle of the mini LED is 130 degrees, and the highest intensity near immediately above the mini LED is 0.32 W/sr mm².

In addition, in the simulation model, light scattering in the exposed part of the light source installation surface 22 is scattering corresponding to the incidence angle of the light and complies with COSN power law (N=2).

A reflectivity, a transmittance, and an absorbance of the substrate 20 are 90%, 5%, and 5%, respectively.

In addition, in the simulation model, the first light scattering body 34 is arranged above the light source installation surface 22. More specifically, in each of Examples 1 to 3 and Comparative Examples 1 to 3, the first light scattering body 34 is arranged parallel to the light source installation surface 22 such that the center position of the light source installation surface 22 matches a center position of the surface of the base 24 in the X and Y directions.

A polyethylene terephthalate (PET) film having a thickness of 0.1 mm is used as the base 24 of the first light scattering body 34. The PET film has a square shape in a plan view and has a refractive index n of 1.576.

In addition, in the simulation model, a surface (that is, the second surface positioned on the opposite side to the light source installation surface 22) of the PET film on the +Z side is the emission surface of the light, and a spreading angle in each portion of the emission surface is 10 degrees.

Examples 1 to 3

In Examples 1 to 3, the distribution of brightness on the emission surface of the light source unit is calculated by the optical simulation.

In Examples 1 to 3, the reflection pattern 30 consisting of the plurality of unit patterns 32 are provided on a surface (that is, the first surface) of the PET film on the −Z side used in the simulation model. The unit pattern 32 consists of titanium oxide and is arranged to be centered at a position immediately above the mini LED in the X and Y directions. The reflection pattern 30 consisting of total nine unit patterns 32 of vertically three by horizontally three are provided.

As illustrated in FIG. 16, each unit pattern 32 is obtained by concentrically overlaying five cylindrical pattern pieces having different diameters. A radius of each pattern piece is 0.5 mm, 1.0 mm, 1.6 mm, 2.2 mm, and 2.65 mm in order from a tip end side. A thickness of each pattern piece in Examples 1 to 3 is set to the values illustrated in Table 1. The thicknesses illustrated in Table 1 are values represented as a ratio with respect to a reference thickness t (t=0.00759 mm).

TABLE 1

| | Whether or Not Low Reflection Pattern Is Present | Interval | Thickness of Pattern | | | | | Planar Portion | Normalized Sigma | Normalized Dynamic Range |
|---|---|---|---|---|---|---|---|---|---|---|
| | | | 0.5 mm | 1.0 mm | 1.6 mm | 2.2 mm | 2.65 mm | | | |
| Example 1 | Present | 1.0 mm | 11.8577 | 5.27009 | 3.29381 | 1.31752 | 1.31752 | 0.1 | 0.13446 | 0.41346 |
| Example 2 | Present | 2.0 mm | 1.31752 | 1.31752 | 1.31752 | 0.39526 | 0.2635 | 0.1 | 0.12184 | 0.38407 |
| Example 3 | Present | 4.0 mm | 0.92227 | 0.65876 | 0.65876 | 0.65876 | 0.39526 | 0.1 | 0.13458 | 0.41185 |
| Comparative Example 1 | Not Present | 1.0 mm | 13.1752 | 6.58762 | 3.95257 | 1.97628 | 1.31752 | 0.1 | 0.12059 | 0.37653 |
| Comparative Example 2 | Not Present | 2.0 mm | 1.97628 | 1.97628 | 1.31752 | 0.65876 | 0.39526 | 0.1 | 0.12844 | 0.39434 |
| Comparative Example 3 | Not Present | 4.0 mm | 1.05402 | 0.92227 | 0.92227 | 0.65876 | 0.39526 | 0.1 | 0.14077 | 0.42741 |

In addition, in Examples 1 to 3, a layer (flat portion) consisting of titanium oxide is provided on the entire surface of the PET film on the −Z side as a base of the reflection pattern 30. A thickness of the flat portion is even and is 0.1 times the reference thickness t.

Optical parameters (a diffusion coefficient, an absorption coefficient, and the like) of the PET film in which the reflection pattern 30 is provided are decided such that the transmittance and the reflectivity match between a calculation value by the simulation and an actual measurement value. Ray tracing simulation software (product name: Light Tools) is used for measuring the transmittance and the reflectivity.

The refractive index n of the PET film in which the reflection pattern 30 is provided is 1.4, and the absorption coefficient is 0.

Furthermore, in Examples 1 to 3, as illustrated in Table 1, an interval between the light source installation surface 22 and the emission surface (that is, the surface of the PET film on the +Z side constituting the first light scattering body 34) is 1 mm, 2 mm, and 4 mm, respectively.

Furthermore, in Examples 1 to 3, the low reflection pattern 38 having a circular shape illustrated in FIG. 17 is formed in the region of the light source installation surface 22 positioned around each mini LED.

The low reflection pattern 38 has a size (radius) of 0.2 mm and a thickness of approximately 0 mm (in a strict sense, approximately 0.01 mm) and is formed for each mini LED.

Comparative Examples 1 to 3

In Comparative Examples 1 to 3, the distribution of brightness on the emission surface of the light source unit is calculated by the optical simulation.

In Comparative Examples 1 to 3, as illustrated in Table 1, the low reflection pattern 38 is not provided, and for other points, similar conditions to Examples 1 to 3 are used. In Comparative Example 1, a condition corresponding to Example 1 is used. In Comparative Example 2, a condition corresponding to Example 2 is used. In Comparative Example 3, a condition corresponding to Example 3 is used.

Comparative Example 4 and Example 4

In Comparative Example 4, the second light scattering body 36 is arranged between the light source installation surface 22 and the first light scattering body 34 in addition to the condition of Comparative Example 1. Similarly, in Example 4, the second light scattering body 36 is arranged between the light source installation surface 22 and the first light scattering body 34 in addition to the condition of Example 1.

The second light scattering body 36 is formed by cutting a polyethylene terephthalate (PET) film having a thickness of 0.1 mm into a square shape in a plan view and laminating an upper surface of the cut-out with a titanium oxide layer. A thickness of the titanium oxide layer is approximately even in each part of the second light scattering body 36 and is specifically 0.8 mm. In addition, the second light scattering body 36 is arranged parallel to the first light scattering body 34 such that the center position of the light source installation surface 22 matches a center position of a surface of the second light scattering body 36 in the X and Y directions. In addition, a position of the second light scattering body 36 in the Z direction is a position that is set to maximize the spreading (degree of diffusion) of the light from the second light scattering body 36.

In Comparative Example 4 and Example 4, the distribution of brightness on the surface of the second light scattering body 36 on the +Z side is calculated by the optical simulation.

(Simulation Results)

The distribution of brightness on the emission surface simulated in Examples 1 to 3 and Comparative Examples 1 to 3 is illustrated in FIGS. 25 to 30. In each of FIGS. 25 to 30, a magnitude of brightness is represented by white and black shades (a graph on a left side in each of FIGS. 25 to 30), and the smoothness of brightness is represented by a histogram (a graph on a right side in each of FIGS. 25 to 30).

In addition, the distribution of brightness on the surface of the second light scattering body 36 simulated in Example 4 and Comparative Example 4 is illustrated in FIGS. 8 and 9, respectively.

In addition, for Examples 1 to 3 and Comparative Examples 1 to 3, the index value (specifically, the normalized sigma and the normalized dynamic range) related to the brightness distribution is calculated from the simulation result of the brightness distribution on the emission surface, and a calculation result is illustrated in Table 1.

In addition, the thickness of each part of the unit pattern 32 in each example of Examples 1 to 3 and Comparative Examples 1 to 3 is illustrated in Table 1.

As is perceived from FIGS. 25 to 30 and Table 1, the smoothness of the brightness distribution on the emission surface is approximately similar between Example 1 and Comparative Example 1, between Example 2 and Comparative Example 2, and between Example 3 and Comparative Example 3 having the equal interval d.

On the other hand, as is perceived by comparing Examples 1 to 3 with Comparative Examples 1 to 3, by providing the low reflection pattern 38, it is possible to further decrease the thickness of each unit pattern 32 of the reflection pattern 30 while maintaining the smoothness of the brightness distribution at the identical level.

For example, under a condition that the interval d is 1 mm (that is, the conditions of Example 1 and Comparative Example 1), the thickness of each part of the unit pattern 32 is further decreased by providing the low reflection pattern 38 as illustrated in Table 1. A similar tendency is also found under a condition that the interval d is 2 mm or 4 mm (that is, the conditions of Example 2 and Comparative Example 2 or the conditions of Example 3 and Comparative Example 3).

The reason that the thickness of the unit pattern 32 can be decreased by providing the low reflection pattern 38 as described above is because the light that is reflected by the light source installation surface 22 and heads toward the first light scattering body 34 again out of the scattered light in the first light scattering body 34 is weakened. This is apparent from the fact that the peak brightness (that is, the brightness near a position immediately above the mini LED) on the surface of the second light scattering body 36 on the +Z side is further decreased in a configuration in which the low reflection pattern 38 is provided in FIGS. 8 and 9 illustrating the simulation results of Comparative Example 4 and Example 4.

In Examples 1 to 3, by reducing the thickness of the unit pattern 32 compared to Comparative Examples 1 to 3, the light source unit can be consequently further thinned. In addition, in Examples 1 to 3, by reducing the thickness of each part of the unit pattern 32, the unit pattern 32 is easily formed (patterned) compared to Comparative Examples 1 to 3, and a degree of difficulty in manufacturing the first light scattering body 34 including the reflection pattern is decreased.

All of the conditions of each of Examples 1 to 3 and Example 4 according to the embodiment of the present invention described so far are within the scope of the present invention. Thus, the effects of the present invention are apparent.

EXPLANATION OF REFERENCES

10: display device
12: liquid crystal display (LCD)
14: light source unit
16: micro light source
18: micro light emitting element
20: substrate
22: light source installation surface
24: base
26: first surface
28: second surface
30: reflection pattern
32: unit pattern
34: first light scattering body
36: second light scattering body
38: low reflection pattern
40: light source unit manufacturing apparatus
42: light distribution characteristics acquisition device
44: pattern forming data generation device
46: pattern forming device
S: imaginary plane

What is claimed is:

1. A light source unit comprising:
    a light source installation surface on which at least one micro light source is installed;
    a base that is arranged with the light source installation surface and has a light-transmitting property;
    a reflection pattern that is formed on a first surface of the base positioned on a light source installation surface side based on light distribution characteristics of the at least one micro light source; and
    a low reflection pattern that is formed in a region of the light source installation surface positioned around the at least one micro light source based on the light distribution characteristics,
    wherein the reflection pattern is constituted of a plurality of unit patterns,
    wherein each of the plurality of unit patterns has a shape of which a thickness is increased toward a center portion, and
    wherein a reflectivity in the region of the light source installation surface in which the low reflection pattern is formed is less than a reflectivity in a region other than the region in which the low reflection pattern is formed.

2. The light source unit according to claim 1,
    wherein an interval between a second surface of the base positioned on an opposite side to the first surface and the light source installation surface is greater than or equal to 1 mm and less than or equal to 4 mm.

3. The light source unit according to claim 2, further comprising:
    a substrate that includes the light source installation surface having a planar shape,
    wherein a plurality of micro light emitting elements as the at least one micro light source are symmetrically arranged on the light source installation surface based on a center position of the light source installation surface.

4. The light source unit according to claim 2,
    wherein a plurality of unit patterns constituting the reflection pattern are symmetrically formed on the first surface based on a center position of the first surface.

5. The light source unit according to claim 4,
    wherein each of the plurality of unit patterns is composed of titanium oxide.

6. The light source unit according to claim 1, further comprising:
    a substrate that includes the light source installation surface having a planar shape,
    wherein a plurality of micro light emitting elements as the at least one micro light source are symmetrically arranged on the light source installation surface based on a center position of the light source installation surface.

7. The light source unit according to claim 1,
    wherein the plurality of unit patterns constituting the reflection pattern are symmetrically formed on the first surface based on a center position of the first surface.

8. The light source unit according to claim 7,
    wherein each of the plurality of unit patterns is composed of titanium oxide.

9. The light source unit according to claim 8,
    wherein each of the plurality of unit patterns has a shape that protrudes toward the light source installation surface and has a diameter decreasing in a stepwise manner in a direction of approaching the light source installation surface.

10. The light source unit according to claim 8,
    wherein each of the plurality of unit patterns is formed on the first surface such that an index value related to a distribution of brightness on a second surface of the base positioned on an opposite side to the first surface satisfies a set condition.

11. The light source unit according to claim 7, wherein each of the plurality of unit patterns has a shape that protrudes toward the light source installation surface and has a diameter decreasing in a stepwise manner in a direction of approaching the light source installation surface.

12. The light source unit according to claim 7, wherein each of the plurality of unit patterns is formed on the first surface such that an index value related to a distribution of brightness on a second surface of the base positioned on an opposite side to the first surface satisfies a set condition.

13. The light source unit according to claim 12, wherein the index value satisfies the set condition by satisfying a first condition and a second condition below, and a thickness, a size, and an arrangement position of each of the plurality of unit patterns are a thickness, a size, and an arrangement position decided to satisfy the first condition and the second condition, first condition: brightness is less than or equal to a reference value in each of a specific region present at a position overlapping with the at least one micro light source and a peripheral region surrounding the specific region on the second surface of the base positioned on the opposite side to the first surface, and second condition: a degree of dispersion of brightness on the second surface is within a target range.

14. The light source unit according to claim 13, wherein a size of the low reflection pattern is a size decided based on an evaluation value related to a distribution of brightness in a plane present at a position closer to the first surface than to the light source installation surface.

15. The light source unit according to claim 14, wherein the distribution of brightness on the second surface changes in accordance with the size of the low reflection pattern, and the thickness, the size, and the arrangement position of each of the plurality of unit patterns are a thickness, a size, and an arrangement position decided in accordance with the size of the low reflection pattern.

16. The light source unit according to claim 1, wherein the base is composed of a film material having a light-transmitting property.

17. The light source unit according to claim 1, wherein the base and the reflection pattern constitute a first light scattering body, and a second light scattering body in which a reflection pattern is not provided is arranged between the first light scattering body and the at least one micro light source.

18. The light source unit according to claim 17, wherein a deviation amount between a normal arrangement position of the first light scattering body with respect to the light source installation surface and an actual arrangement position of the first light scattering body is less than or equal to 0.2 mm in each of two directions that are parallel to the light source installation surface and are orthogonal to each other.

19. A display device comprising:

a liquid crystal display, wherein the light source unit according to claim 1 is provided on a rear surface side of the liquid crystal display as a backlight unit.

20. A light source unit manufacturing apparatus for manufacturing the light source unit according to claim 1, the light source unit manufacturing apparatus comprising:

a light distribution characteristics acquisition device that acquires the light distribution characteristics of the at least one micro light source; and a pattern forming device that forms the reflection pattern on the first surface of the base and forms the low reflection pattern in the region of the light source installation surface positioned around the at least one micro light source in accordance with pattern forming data generated based on the acquired light distribution characteristics.

* * * * *